United States Patent
Sato

(10) Patent No.: US 7,349,621 B2
(45) Date of Patent: Mar. 25, 2008

(54) INFORMATION RECORDING APPARATUS WITH SELECTIVE CONTROL OF RECORDING MEDIUM AND RECORDING MEANS DRIVE MEANS

(75) Inventor: Keiji Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1132 days.

(21) Appl. No.: 10/192,908

(22) Filed: Jul. 10, 2002

(65) Prior Publication Data

US 2003/0012553 A1    Jan. 16, 2003

(30) Foreign Application Priority Data

Jul. 13, 2001    (JP) .............. 2001-214349

(51) Int. Cl.
  H04N 5/91    (2006.01)
  H04N 5/268    (2006.01)
(52) U.S. Cl. .............. 386/46; 386/68; 386/97; 348/705; 348/706
(58) Field of Classification Search .......... 386/97, 386/46, 68; 348/705–706
  See application file for complete search history.

(56) References Cited

U.S. PATENT DOCUMENTS

| | | | |
|---|---|---|---|
| 4,554,604 A * | 11/1985 | Koyama | 360/95 |
| 4,982,390 A * | 1/1991 | Tanaka | 369/83 |
| 5,168,363 A * | 12/1992 | Kojima et al. | 348/704 |
| 5,285,329 A * | 2/1994 | Takayama | 360/70 |
| 5,438,432 A * | 8/1995 | Koue et al. | 358/426.06 |
| 5,523,895 A * | 6/1996 | Takayama | 386/46 |
| 6,346,937 B1 * | 2/2002 | Sasaki et al. | 345/211 |
| 6,486,916 B1 * | 11/2002 | Stevens | 348/372 |
| 6,741,789 B1 * | 5/2004 | Hoshi | 386/46 |
| 2001/0051034 A1 * | 12/2001 | Okamura | 386/46 |

* cited by examiner

Primary Examiner—Thai Q. Tran
Assistant Examiner—Daquan Zhao
(74) Attorney, Agent, or Firm—Cowan, Liebowitz & Latman, P.C.

(57) ABSTRACT

An information recording apparatus has a stop mode in which only recording means comprised of a rotatable drum on which a recording head is mounted and recording medium driving means comprised of a capstan/pinch roller are stopped, which stop mode can be changed from a record temporary stop mode. During the stop mode of the recording means and the recording medium driving means, a video signal photo-taken by a camera of the information recording apparatus can be outputted externally, and, change to the stop mode is made effective by a combination of user's selection and/or presence/absence of an external connection device.

11 Claims, 16 Drawing Sheets

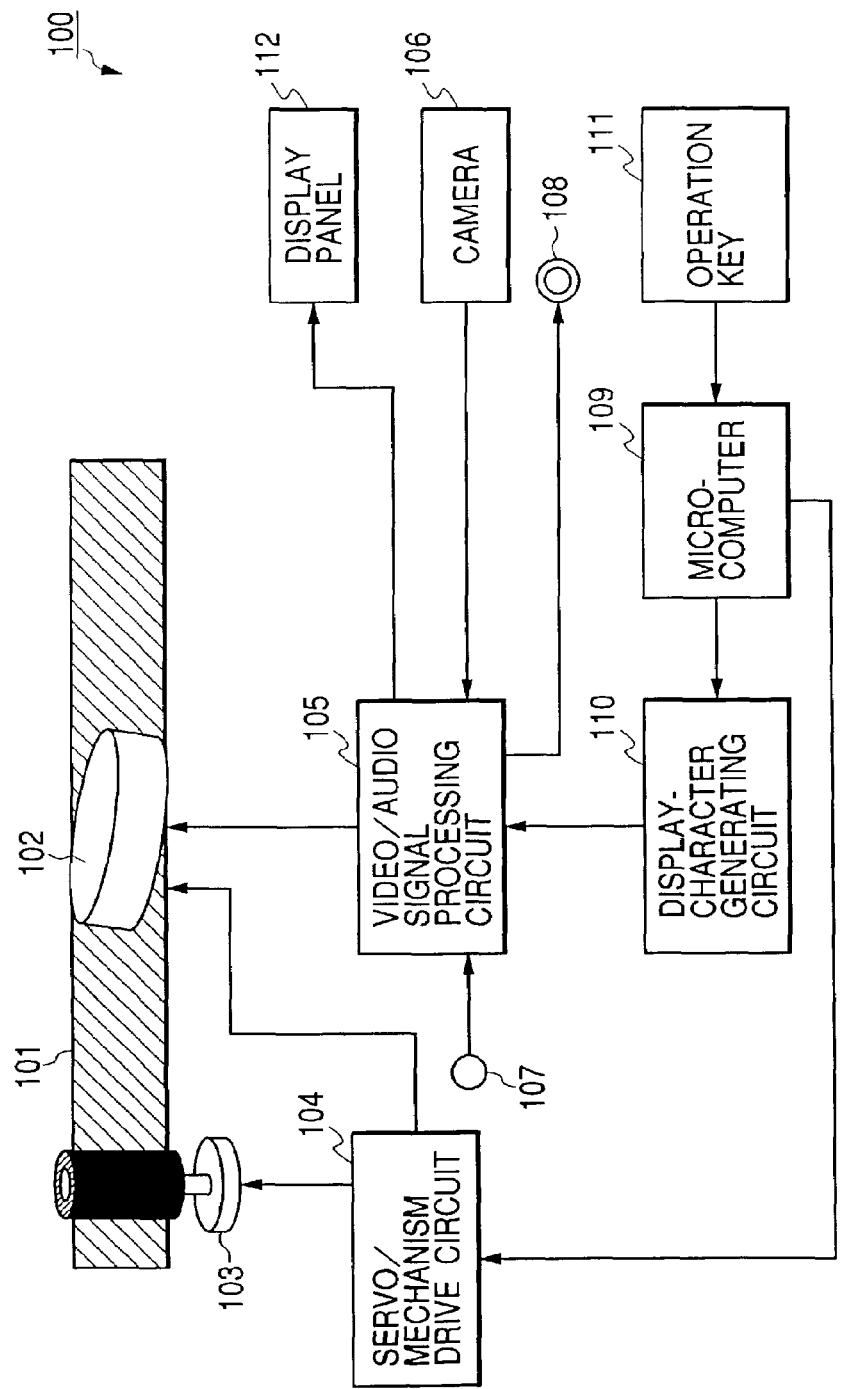

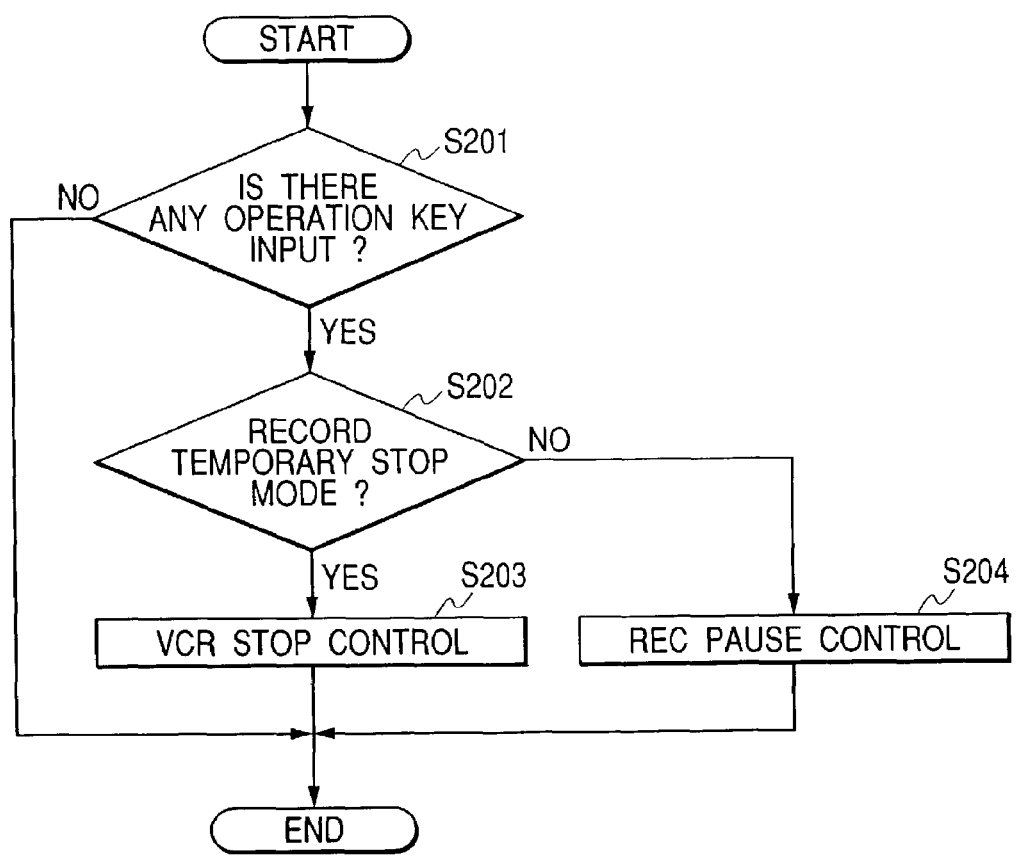

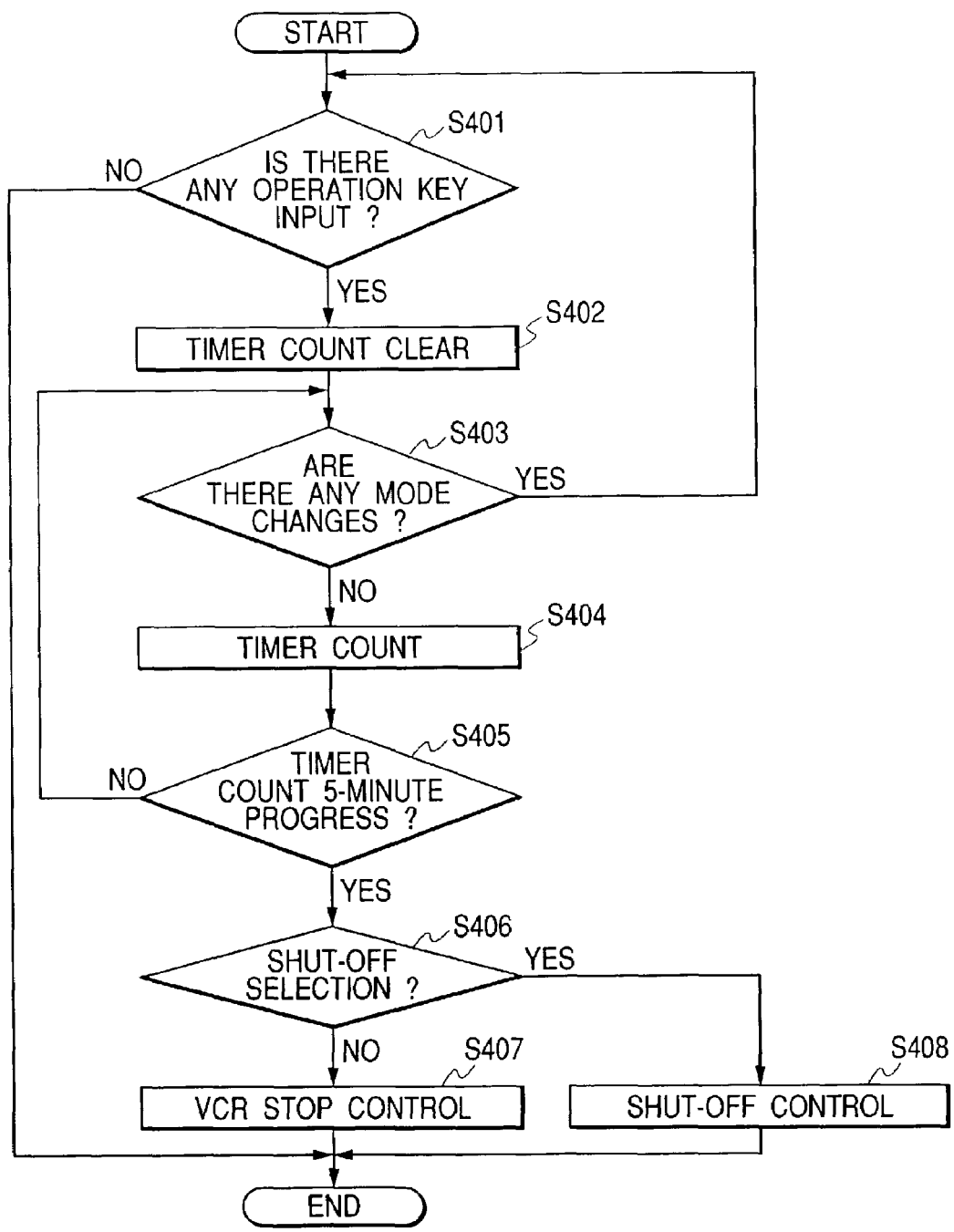

INFORMATION RECORDING APPARATUS WITH SELECTIVE CONTROL OF RECORDING MEDIUM AND RECORDING MEANS DRIVE MEANS

BACKGROUND OF THE INVENTION

1. Field of the Invention

The present invention relates to an information recording apparatus and an image recording apparatus for use with a video cassette recorder of camera integral type which is operated in operation modes such as, for example, a recording (Rec) mode, a record temporary stop (Rec-Pause) mode and the like.

2. Related Background Art

In recent years, a welfare digital recording apparatus of camera integral type (referred to merely as "video cassette recorder (VCR) of camera integral type" hereinafter) has been popularized. Further, since image quality of the welfare VCR of camera integral type has been enhanced, by taking advantage of compactness and easy handling, the welfare VCR has often been used for business applications.

FIG. 16 is a block diagram showing a construction of the above-mentioned VCR 800 of camera integral type.

As shown in FIG. 16, the VCR 800 of camera integral type includes a mechanical chassis 831, a servo/mechanism drive circuit 833, a microcomputer 834, a power source switch 835, an operation key 836, a power source circuit (power source supply circuit) 837, a camera 838 and a video/audio signal processing circuit 839.

The mechanical chassis 831 is provided with a feature to which a magnetic tape 832 as a recording medium is mounted, a rotatable drum (not shown) to which a magnetic head is mounted, a capstan (not shown) for running the magnetic tape 832 and a pinch roller (not shown), and the servo/mechanism drive circuit 833 serves to drive the mechanical chassis 831.

The microcomputer 834 serves to control the servo/mechanism drive circuit 833 and judge or determine the state of the power source switch 835 for selecting power ON/OFF of the entire VCR 800 of camera integral type so that, on the basis of judgement, if the power ON condition is selected, the power source circuit 837 is turned ON to supply an electric power to the entire VCR 800 of camera integral type, and, if the power OFF condition is selected, the power source circuit 837 is turned OFF.

The operation key 836 has an operation button for selecting an operation mode such as a recording mode, a record temporary stop mode or the like, with respect to the VCR 800 of camera integral type.

The camera 838 is designed to include a microphone, a lens and a camera signal processing circuit so that object photo-taking signals (video signal and audio signal) can be outputted.

The video/audio signal processing circuit 839 serves to process or treat the video signal and the audio signal outputted from the camera 838 and convert such signals into an RF signal to be recorded on the magnetic tape via the magnetic head of the mechanical chassis 831.

When the user effects the photo-taking by using the above-mentioned VCR 800 of camera integral type, first of all, the user changes the power source switch from the OFF condition to the ON condition. When the microcomputer 834 detects the ON condition of the power source switch, the microcomputer turns ON the power source circuit 837. As a result, the electric power is supplied to the entire VCR 800 of camera integral type.

Further, the microcomputer 834 detects, via the servo/mechanism drive circuit 833, whether the recordable magnetic tape 832 is mounted to the mechanical chassis 831 or not. As a result of such detection, if the recordable magnetic tape 832 is mounted to the mechanical chassis 831, the microcomputer 834 controls the servo/mechanism drive circuit 833 so that the condition of the mechanical chassis 831 is automatically transferred (loaded) from a stop mode to the record temporary stop mode.

On the basis of the control of the microcomputer 834, the servo/mechanism drive circuit 833 controls to rotate a drum motor of the rotatable drum of the mechanical chassis 831 and to urge the capstan and the pinch roller against the magnetic tape 832 so that the magnetic tape 832 is contacted with the rotating magnetic head with moderate tension. In this way, the transferring of the operation mode to the record temporary stop mode is finished.

Then, the user catches an object to be photo-taken by his/her camera 838, and, when a desired photo-taking condition is established, the user manipulates a record start button of the operation key 836.

When the microcomputer 834 detects the manipulation of the record start button, the microcomputer instructs the driving of a capstan motor of the mechanical chassis 831 to the servo/mechanism drive circuit 833, thereby starting the feeding of the magnetic tape 832. In this way, the transferring to the record mode is completed and a recording operation is started.

When it is desired to temporarily stop the record mode, the user manipulates a record temporary stop button of the operation key 836.

When the microcomputer 834 detects the manipulation of the record temporary stop button of the operation key 836, the microcomputer instructs stop of the driving of the capstan motor of the mechanical chassis 831 to the servo/mechanism drive circuit 833 and controls the entire VCR 800 of camera integral type so that the record temporary stop mode is continued until the record start button of the operation key 836 is manipulated again.

Here, if the record temporary stop mode is continued, first of all, in this case, since the condition of the VCR 800 of the camera integral type is a condition that the running of the magnetic tape 832 is stopped, the same portion of the magnetic tape 832 continues to be traced by the magnetic head rotating at a high speed.

If the same portion of the magnetic tape 832 continues to be traced by the magnetic head of the mechanical chassis 831, a protective film coated on a surface layer of the magnetic tape 832 is damaged, with the result that there may arise a problem that the magnetic head is clogged by magnetic powder.

Further, in the record temporary stop mode, since the drum motor of the mechanical chassis 831 is driven by the servo/mechanism drive circuit 833, the power consumption of the entire VCR 800 of camera integral type becomes great. Particularly when the drum motor is driven by a battery, since continuation of the record temporary stop mode for a long term consumes the battery, careless disposition or let-alone is not preferred.

To avoid this, the microcomputer 834 judges whether or not the record temporary stop mode continues up to a predetermined time period, and, as a result of such judgement, if the record temporary stop mode continues up to the predetermined time period, the microcomputer controls the servo/mechanism drive circuit 833 so that the condition of the mechanical chassis 831 is automatically transferred from the record temporary stop mode to the stop (Off) mode.

When transferred to the stop mode, the servo/mechanism drive circuit 833 releases the urging of the capstan and the pinch roller of the mechanical chassis 831 and stops the drum motor of the rotatable drum, on the basis of the control from the microcomputer 834.

When the transferring of the mechanical chassis 831 to the stop mode is completed, the microcomputer 834 instructs OFF (stop) of power supply to the entire VCR 800 of camera type to the power source circuit 837.

By the way, when the above-mentioned VCR 800 of camera type shown in FIG. 16 is used for business application such as production of image or picture, for example, there is prepared an equipment in which an image producer and the like other than a cameraman or a photographer can always monitor the object to be photo-taken caught by the camera by photo-taking the object by means of the VCR 800 of camera integral type by the cameraman (or by means of the VCR fixed by a tripot) and by connecting the video output to a TV monitor.

With this arrangement, in the photo taking of a wild animal, a limited photo-taking chance (shutter chance) can be obtained while observing the object to be photo-taken by looking at the image outputted to the TV monitor for a long term.

However, as mentioned above, the conventional VCR 800 of camera integral type was constituted so that, when the continuation of the record temporary stop mode exceeds the predetermined time period, the power source is automatically turned OFF.

Accordingly, in the conventional VCR 800 of camera integral type, for example, when the record temporary stop mode is selected to grasp the photo-taking chance in the photo-taking of the wild animal, since the power source is automatically turned OF after the predetermined time period is elapsed, not only the image outputted to the TV monitor is interrupted, but also the power source may be turned OFF at the same time when the photo-taking chance is reached, thereby missing the photo-taking chance.

Particularly, in the production of image, if the power source of the VCR 800 of camera integral type is once turned OFF and the image outputted to the TV monitor is interrupted, since it is required that plural photo-taking stuffs be prepared after the power source of the VCR 800 of camera integral type is turned ON again and layout of the object to be photo-taken is set again, considerable time is lose until the photo-taking can be re-started.

SUMMARY OF THE INVENTION

An object of the present invention is to solve the above-described problems.

Another object of the present invention is to provide an information recording apparatus capable of effecting an information recording operation suitable for both domestic and business applications.

As a preferred embodiment for such objects, the present invention disclose an information recording apparatus for recording information on a recording medium, comprising information acquiring means for acquiring information to be recorded on the recording medium, recording means for recording the information acquired by the information acquiring means on the recording medium, first drive means for driving the recording means, second drive means for driving the recording medium so that the information is recorded on the recording medium by the recording means, output means for outputting the information acquired by the information acquiring means to an external device, and control means for controlling in such a manner that, when a recording operation onto the recording medium is paused, the first drive means and the second drive means are stopped and the output means is continuously operated.

Further, the present invention discloses an information recording apparatus for recording information on a recording medium, comprising information acquiring means for acquiring information to be recorded on the recording medium, recording means for recording the information acquired by the information acquiring means on the recording medium, first drive means for driving the recording means, second drive means for driving the recording medium so that the information is recorded on the recording medium by the recording means, output means for outputting the information acquired by the information acquiring means to an external device, and control means for controlling in such a manner that, in a predetermined operation mode, on the basis of a connection condition of other apparatus or system to the output means, the first drive means and the second drive means are stopped and the output means is continuously operated.

Further, the present invention discloses an image recording apparatus for recording an image on a recording medium by means of a recording head, comprising image processing means for processing a signal of an image, first drive means for driving the recording head, second drive means for driving the recording medium so that the image acquired by the image processing means is recorded at a predetermined position by the recording head, output means for outputting the image acquired by the image processing means to an external device, and control means for controlling in such a manner that, when a recording operation onto the recording medium is paused, the first drive means and the second drive means are stopped, and the image processing means and the output means are continuously operated.

Further, the present invention discloses an image recording apparatus for recording an image on a recording medium by means of a recording head, comprising image processing means for processing a signal of an image, first drive means for driving the recording head, second drive means for driving the recording medium so that the image acquired by the image processing means is recorded at a predetermined position by the recording head, output means for outputting the image acquired by the image processing means to an external device, and control means for controlling in such a manner that, in a predetermined operation mode, on the basis of a connection condition of other apparatus or system to the output means, the first drive means and the second drive means are stopped, and the image processing means and the output means are continuously operated.

Still other objects of the present invention, and the advantages thereof, will become fully apparent from the following detailed description of the embodiments.

BRIEF DESCRIPTION OF THE DRAWINGS

FIG. 1 is a constructional view of a VCR of camera integral type to which the present invention is applied in a first embodiment of the present invention;

FIG. 2 is a flow chart for explaining an operation of the VCR of camera integral type in the first embodiment;

FIG. 7 is a flow chart for explaining an operation of the VCR of camera integral type in the fourth embodiment;

DETAILED DESCRIPTION OF THE PREFERRED EMBODIMENTS

Figure 3A:
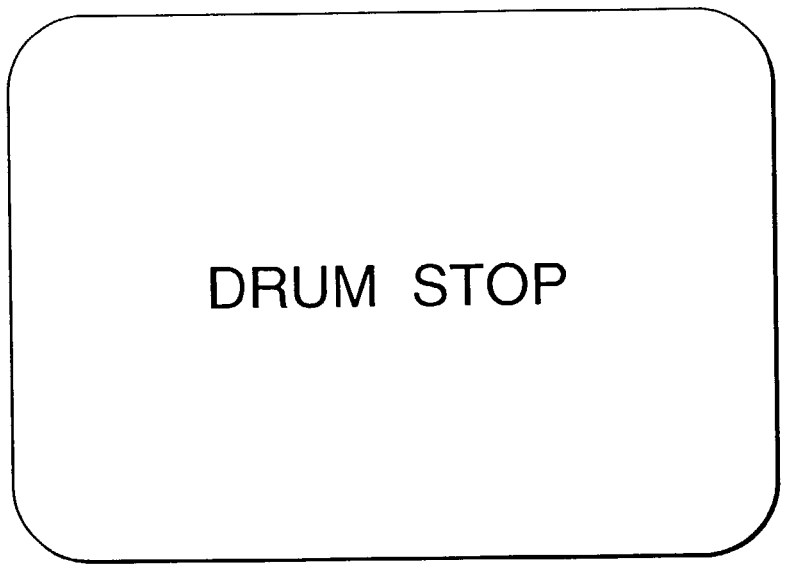
FIGS. 3A and 3B are views for explaining an example of display on a display panel of a VCR of camera integral type to which the present invention is applied in a second embodiment of the present invention.

The preferred embodiments of the present invention will now be described in detail hereinafter with reference to the accompanying drawings.

First Embodiment

The present invention is applied to a VCR 100 of camera integral type, for example.

The VCR 100 of camera integral type according to a first embodiment of the present invention is designed so that, when a record temporary stop (Rec Pause) mode continues up to a predetermined time period, the record temporary stop mode is changed to a mode in which a power source of the VCR 100 of camera integral type is not automatically turned OFF, but only a capstan/pinch roller 103 and a rotatable drum 102 for conveying a recording medium 101 are stopped in accordance with user's instruction, and a video signal outputted from a camera 106 is continuously outputted externally.

With this design, the VCR 100 of camera integral type can be used for both domestic and business applications without inconvenience.

Now, an operation and a construction of the VCR 100 of camera integral type according to the illustrated embodiment will be explained concretely.

<Construction of VCR 100 of Camera Integral Type>

As shown in FIG. 1, the VCR 100 of camera integral type includes a rotatable drum 102, a capstan/pinch roller 103, a servo/mechanism drive circuit 104, a video/audio signal processing circuit 105, a camera 106, a microphone 107, an external output terminal 108 for a video signal, a microcomputer 109, a display-character generating circuit 110, an operation key 111 and a display panel 112.

The rotatable drum 102 is provided with a magnetic head.

The capstan/pinch roller 103 includes a mechanical mechanism capable of loading and unloading the tape and a tape driving mechanism such as a reel motor and serves to convey the magnetic tape 101.

The servo/mechanism drive circuit 104 serves to drive the rotatable drum 102 and the capstan/pinch roller 103. Incidentally, the rotatable drum 102 and the capstan/pinch roller 103 are also referred to as "mechanical chassis" collectively.

The microcomputer 109 has a CPU and a memory and serves to control the operation of the entire VCR 100 of camera integral type.

The operation key 111 includes buttons for effecting various operation instructions to the VCR 100 of camera integral type.

The camera 106 includes a lens and a camera signal processing circuit so that a video signal obtained by photo-taking an object is outputted.

The video/audio signal processing circuit 105 serves to process the video signal outputted from the camera 106 and an audio signal inputted from the microphone 107 to convert such signals into an RF signal to be recorded by the magnetic head of the rotatable drum 102.

The video signal external output terminal 108 serves to externally output the video signal processed by the video/audio signal processing circuit 105 to a TV monitor and the like.

The display-character generating circuit 110 serves to output for example character data corresponding to user's manipulation of the operation key 111 to the display panel 112 through the video/audio signal processing circuit 105 under the control of the microcomputer 109. As a result, a character corresponding to the user's manipulation is displayed on the display panel 112.

<Operation of VCR 100 of Camera Integral Type>

FIG. 2 is a flow chart showing main operations of the VCR 100 of camera integral type.

For example, the microcomputer 109 reads out and executes a processing program corresponding to the flow chart of FIG. 2 previously stored in a program memory through the CPU. As a result, the VCR 100 of camera integral type is operated as follows.

Step S201:

The microcomputer 109 judges whether the operation key 111 is manipulated by the user, and, as a result of such judgement, only if the operation key is manipulated (presence of operation key input), processing from a next step S202 is executed.

Step S202:

As a result of judgement in the step S201, if the operation key 111 is manipulated by the user, the microcomputer 109 judges whether a present operation mode of the VCR 100 of camera integral type is a "record temporary stop mode" or not.

As a result of such judgement, if the present mode is the "record temporary stop mode", the program goes to a next step S203; whereas, if otherwise, the program goes to a step S204 which will be described later.

Step S203:

As a result of the judgement in the step S202, if the VCR 100 of camera integral type is in the "record temporary stop mode", the microcomputer 109 effects control in such a manner that the operation of only the mechanical chassis (rotatable drum 102 and capstan/pinch roller 103) is stopped and an output signal (video signal photo-taken by the camera and processed in the video/audio signal processing circuit 105) from the external output terminal 108 is continuously outputted to the TV monitor and the like.

As an operation in the mode in which only the mechanical chassis is stopped, concretely, the operations of the rotatable drum 102 and the capstan/pinch roller 103 are stopped, and the camera 106, microphone 107 and video/audio signal processing circuit 105 continue to be operated while supplying an electric power to them. Further, an operation for releasing (returning to an unloading condition) contact (winding) between the magnetic tape 101 and the rotatable drum 102 may also be included.

Step S204:

As a result of the judgement in the step S202, if the VCR of camera integral type is not in the "record temporary stop mode", the microcomputer 109 changes the operation mode of the VCR 100 of camera integral type to the "record temporary stop mode". After changed to the mode in which only the mechanical chassis is stopped as mentioned above, it is also possible to change to the record temporary stop mode by the user's re-manipulation.

As mentioned above, in the illustrated embodiment, it is designed so that, if the VCR 100 of camera integral type is in the "record temporary stop mode", such a mode is not changed to the automatic power source OFF mode (i.e., complete operation stop mode) but is changed to the mode in which only the mechanical chassis is stopped, and the video signal being photo-taken can be outputted continuously from the external output terminal 108. Further, the changing to the mode in which only the mechanical chassis is stopped can be executed by the user's key manipulation.

In this way, the conventional problem in which the apparatus is automatically changed to the power source OFF mode unintentionally to interrupt the image to the connected monitor can be solved.

Second Embodiment

In a second embodiment of the present invention, an example that information regarding the operation modes is displayed on the display panel 112 in the VCR 100 of camera integral type of FIG. 1 will be explained.

For example, in a condition after the power source of the VCR 100 of camera integral type was turned ON and the mode of the VCR has automatically been changed to the record temporary stop mode, when it is desired to change to the mode in which only the mechanical chassis (rotatable drum 102 and capstan/pinch roller 103) is stopped by the user's manipulation of the operation key 111, a character "DRUM STOP" as shown in FIG. 3A is displayed on the display panel 112 in accordance with the user's manipulation. Such display may be displayed during when the mode in which only the mechanical chassis is stopped is continued.

Figure 3B:
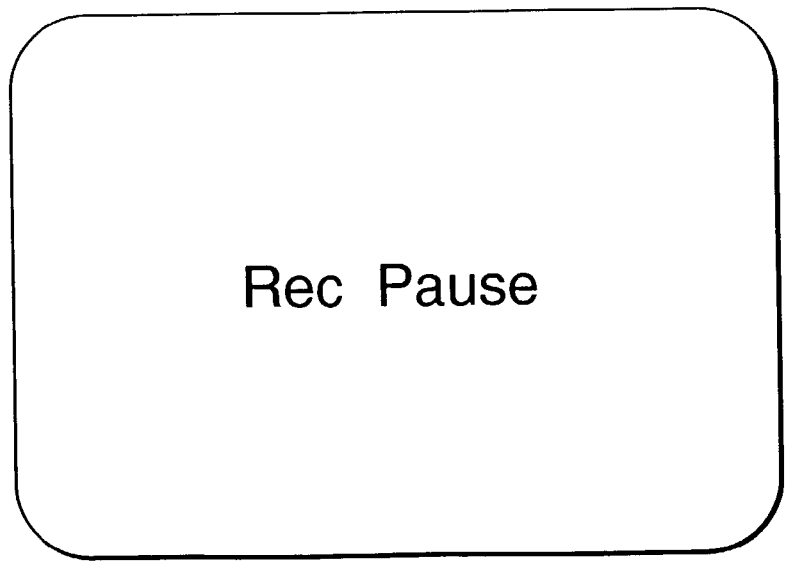

Further, when the user tries to change the mode in which only the mechanical chassis is stopped to the record temporary stop mode by the manipulation of the operation key 111, on the basis of the user's manipulation, a character "Rec Pause" as shown in FIG. 3B is displayed on the display panel 112.

Figure 4:
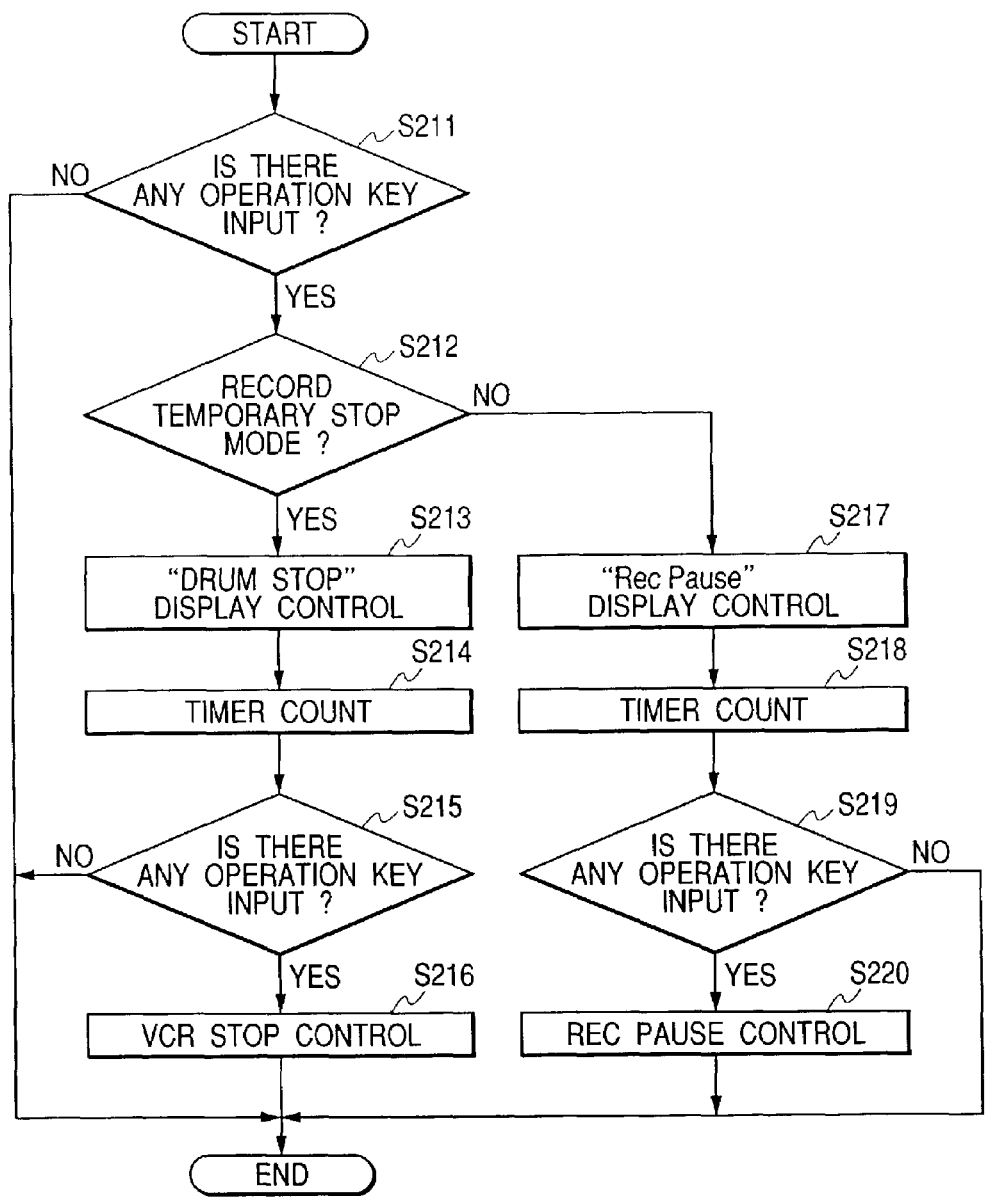
FIG. 4 is a flow chart for explaining an operation of the VCR of camera integral type in the second embodiment.

FIG. 4 is a flow chart showing the operation of the VCR 100 of camera integral type according to the illustrated embodiment.

For example, the microcomputer 109 reads out and executes a processing program corresponding to the flow chart of FIG. 4 previously stored in a program memory through the CPU. As a result, the VCR 100 of camera integral type is operated as follows.

Step S211:

The microcomputer 109 judges whether the operation key 111 is manipulated by the user, and, as a result of such judgement, only if the operation key is manipulated (presence of operation key input), processing from a next step S212 is executed.

Step S212:

As a result of judgement in the step S211, if the operation key 111 is manipulated by the user, the microcomputer 109 judges whether a present operation mode of the VCR 100 of camera integral type is a "record temporary stop mode" or not.

As a result of such judgement, if the present mode is the "record temporary stop mode", the program goes to processing from a next step S213; whereas, if otherwise, the program goes to processing from a step S217 which will be described later.

Step S213:

As a result of the judgement in the step S212, if the VCR 100 of camera integral type is in the "record temporary stop mode", the microcomputer 109 instructs the display-character generating circuit 110 to output the character "DRUM STOP" as shown in FIG. 3A.

Step S214:

The microcomputer 109 counts a timer for a predetermined time period. Here, the predetermined time period includes a time period to the extent during which the user can ascertain the operation mode to which the VCR 100 of camera integral type is next transferred. During the predetermined time period for counting the timer, the character "DRUM STOP" as shown in FIG. 3A is displayed on the display panel 112. Incidentally, when the setting of the displaying time is changed, the character "DRUM STOP" can be displayed during when the subsequent mode in which only the mechanical chassis is stopped is continued.

Step S215:

The microcomputer 109 again judges whether the operation key 111 is manipulated by the user, and, as a result of such judgement, only if the operation key is manipulated (presence of operation key input), processing in a next step S216 is executed; whereas, if there is no manipulation (for example, if the user recognizes the error operation by looking at the "DRUM STOP" display and releases the operation key 111 during the predetermined time period timer-counted), the program is ended.

Step S216:

As a result of the judgement in the step S215, if the operation key 111 is continuously manipulated by the user, the microcomputer 109 controls to operate the VCR in the mode in which only the mechanical chassis (rotatable drum 102 and capstan/pinch roller 103) is stopped and to continuously output the output signal (video signal photo-taken by the camera 106 and processed in the video/audio signal processing circuit 105) from the external output terminal 108 to the TV monitor and the like.

As an operation in the mode in which only the mechanical chassis is stopped, concretely, the operations of the rotatable drum 102 and the capstan/pinch roller 103 are stopped, and the camera 106, microphone 107 and video/audio signal processing circuit 105 continue to be operated while supplying an electric power to them. Further, an operation for releasing (returning to an unloading condition) contact (winding) between the magnetic tape 101 and the rotatable drum 102 may also be included.

Step S217:

As a result of the judgement in the step S212, if the VCR 100 of camera integral type is not in the "record temporary stop mode", the microcomputer 109 instructs the display-character generating circuit 110 to output the character "Rec Pause" shown in FIG. 3B to the display panel 112.

Step S218:

The microcomputer 109 counts a timer for a predetermined time period. Here, the predetermined time period includes a time period to the extent during which the user can ascertain the operation mode to which the VCR 100 of camera integral type is next transferred. During the predetermined time period, the character "Rec Pause" as shown in FIG. 3B is displayed on the display panel 112.

Step S219:

The microcomputer 109 again judges whether the operation key 111 is manipulated by the user, and, as a result of such judgement, only if the operation key is manipulated (presence of operation key input), processing in a next step S220 is executed; whereas, if there is no manipulation (for example, if the user recognizes the error operation by looking at the "Rec Pause" display and releases the operation key 111 during the predetermined time period timer-counted), the program is ended.

Step S220:

As a result of the judgement in the step S219, if the operation key 111 is continuously manipulated by the user, the microcomputer 109 transfers the operation mode of the VCR 100 of camera integral type to the "record temporary stop mode"

As mentioned above, in the illustrated embodiment, since it is designed so that the mode to which the VCR 100 of camera integral type is changed is display, operability and reliability of operation can be more enhanced.

Third Embodiment

Figure 5:
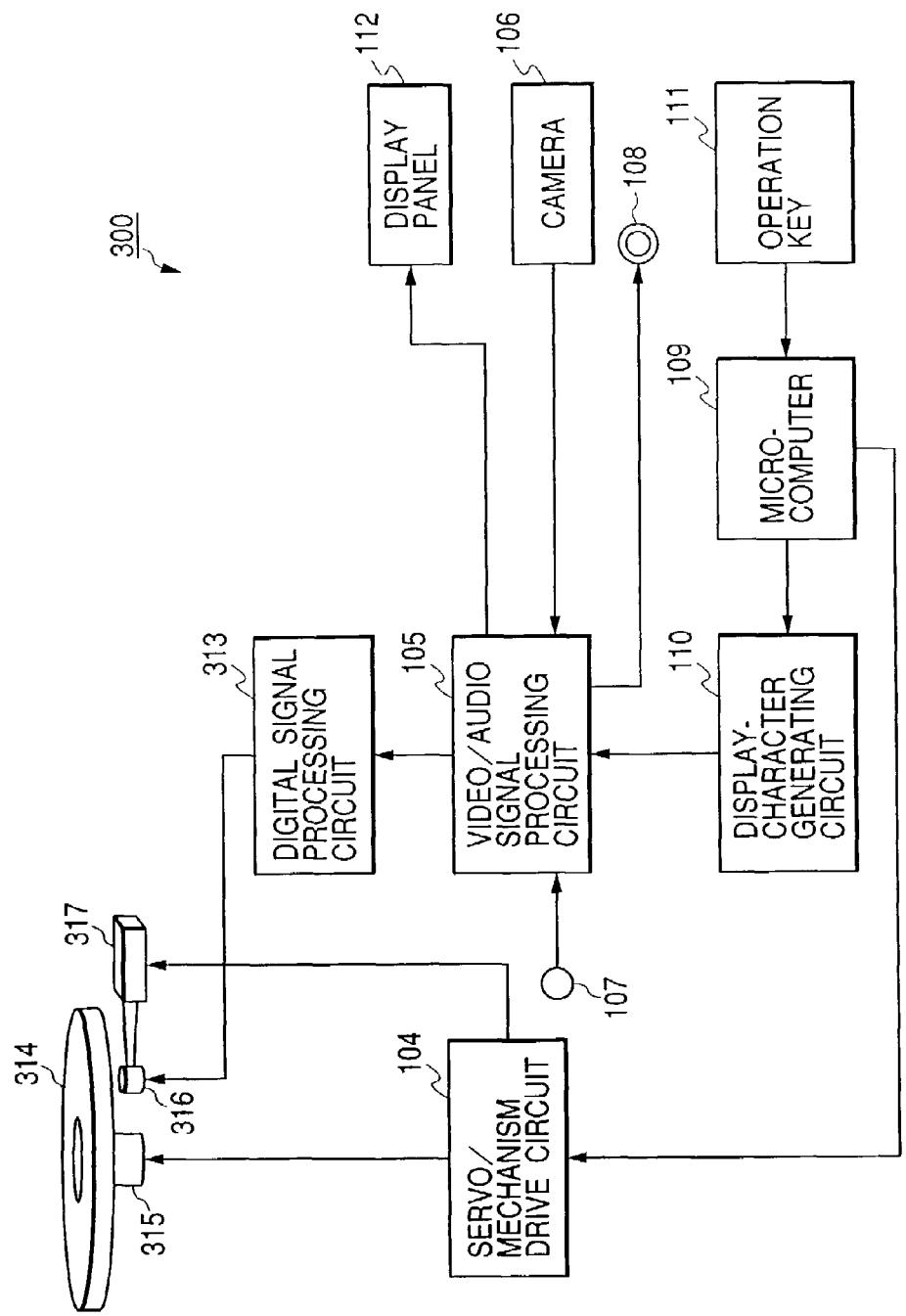
FIG. 5 is a constructional view of a recording apparatus of camera integral type to which the present invention is applied in a third embodiment of the present invention.

The present invention is applied to a recording apparatus 300 of camera integral type as shown in FIG. 5, for example.

The recording apparatus 300 of camera integral type according to a third embodiment of the present invention is designed to effect recording on a disk-shaped recording medium 314, different from the fact that the VCR 100 of camera integral type of FIG. 1 effects the recording on the magnetic tape 101.

Incidentally, in the recording apparatus 300 of camera integral type shown in FIG. 5, elements having the same functions as those in the VCR 100 of camera integral type of FIG. 1 are designated by the same reference numerals, and detailed explanation thereof will be omitted.

Concretely, the recording apparatus 300 of camera integral type includes a disk motor 315 for rotatingly driving the disk recording medium 314, a recording head 316 for recording a signal on the disk recording medium 314, and an actuator 317 for shifting the recording head 316. Accordingly, the servo/mechanism drive circuit 104 controls the driving of the disk motor 315 and the actuator 317.

Further, the recording apparatus 300 of camera integral type is provided with a digital signal processing circuit 313 for converting the signal outputted from the video/audio signal processing circuit 105 into digital codes.

In the recording apparatus 300 of camera integral type as mentioned above, in the record temporary stop mode, the microcomputer 109 controls the driving of the disk motor 315 via the servo/mechanism drive circuit 104 and controls a shifting movement of the recording head 316 to a recording start position via the actuator 317.

Further, in the mode in which only the servo/mechanism is stopped, the microcomputer 109 controls the stopping of the disk motor 315 via the servo/mechanism drive circuit 104 and controls a shifting movement of the recording head 316 to a waiting position via the actuator 317. Alternatively, in the mode in which only the servo/mechanism is stopped, the microcomputer 109 may control the stopping of the disk motor 315 and may control the waiting of the recording head 316 while maintaining the present position (or the waiting at the recording start position).

Also in the illustrated embodiment, by operating the recording apparatus 300 of camera integral type in accordance with the program such as shown in the flow chart of FIG. 2 or FIG. 4, the same effect as those in the first and second embodiments can be achieved.

Fourth Embodiment

In a fourth embodiment of the present invention, in the VCR 100 of camera integral type, particularly when the record temporary stop mode is continued for a predetermined time period, the user can appropriately select whether control (referred to also as "shut-off control" hereinafter) in which the mode is automatically changed to the stop mode and the power source of the entire VCR 100 of camera integral type is turned OFF is executed or control (referred to also as "VCR stop control" hereinafter) in which the mode is changed to the mode in which only the mechanical chassis (rotatable drum 102 and capstan/pinch roller 103) is stopped and the image is continuously outputted from the external output terminal 108 for the video signal is executed.

Figure 6A:
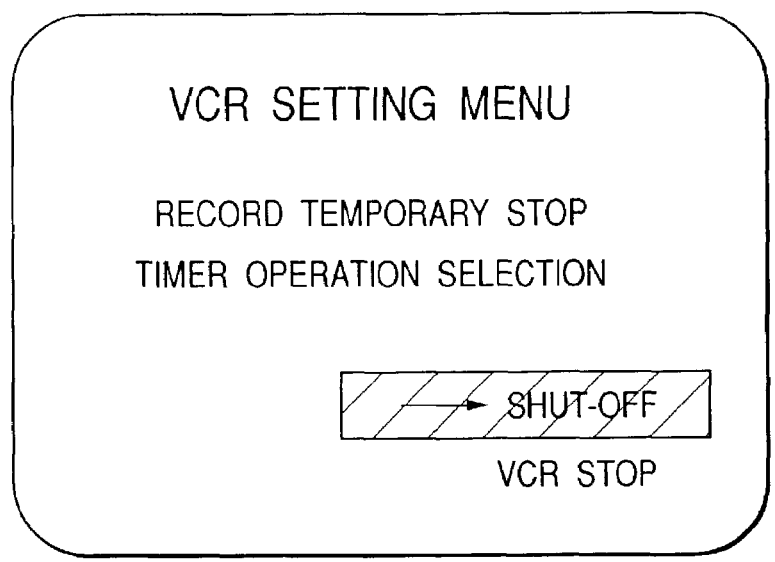
FIGS. 6A and 6B are views for explaining an example of display on a display panel of a VCR of camera integral type to which the present invention is applied in a fourth embodiment of the present invention.
Figure 6B:
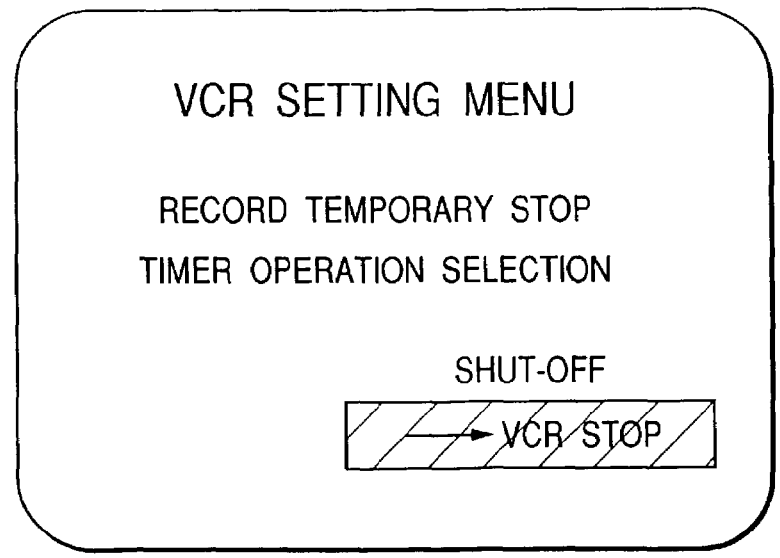

FIGS. 6A and 6B show an example of menu display on the display panel 112 when the above-mentioned selection is effected.

FIG. 6A shows the display when the user selects the "shut-off control", and FIG. 6B shows the display when user selects the "VCR stop control"

FIG. 7 is a flow chart showing the operation of the VCR 100 of camera integral type. For example, the microcomputer 109 reads out and executes a processing program corresponding to the flow chart of FIG. 7 previously stored in a program memory through the CPU. As a result, the VCR 100 of camera integral type is operated as follows.

Step S401:

The microcomputer 109 judges whether the operation mode to which the VCR 100 of camera integral type is to be changed is the "record temporary stop mode" or not.

As a result of such judgement, only if the VCR 100 of camera integral type is changed to the record temporary stop mode, the program goes to processing from a next step S402; whereas, if otherwise, the program is ended.

Step S402:

As a result of the judgement in the step S401, when the VCR 100 of camera integral type is changed to the record temporary stop mode, the microcomputer 109 initializes a timer for counting a continuation time of the record temporary stop mode and newly start the counting.

Step S403:

The microcomputer 109 judges whether manipulation regarding the changing to a new operation mode is effected by the user by using the operation key 111.

As a result of such judgement, if there is the manipulation (presence of the changing to the mode), such changing to the mode is effected, and the program is returned to the step S401 again and the processing is repeated; whereas, if no manipulation, the program goes to processing from a next step S404.

Step S404:

As a result of the judgement in the step S403, if there is no changing to the new mode, the microcomputer 109 continues the counting of the timer initialized in the step S402.

Step S405:

The microcomputer 109 checks the counted value of the timer to judge whether the record temporary stop mode continues up to a predetermined time period (five minutes in FIG. 7).

As a result of such judgement, if the record temporary stop mode does not continue up to the predetermined time period, the program is returned to the step S403 again and the processing is repeated; whereas, if the record temporary stop mode continues up to the predetermined time period, the program goes to a next step S406.

Step S406:

As a result of the judgement in the step S405, if the record temporary stop mode continues up to the predetermined time period, the microcomputer 109 judges whether the "shut-off control is selected or the "VCR stop control" is selected on the basis of the user's selection in the menu screens shown in FIGS. 6A and 6B.

As a result of such judgement, if the "shut-off control is selected, the program goes to a step S408; whereas, if the "VCR stop control" is selected, the program goes to a step S407.

Step S407:

As a result of the judgement in the step S406, if the "VCR stop control" is selected, the microcomputer 109 effects control in such a manner that the changing to the mode in which only the mechanical chassis (rotatable drum 102 and capstan/pinch roller 103) is stopped is effected and the image being photo-taken is continuously outputted from the external output terminal 108 for the video signal.

As an operation in the mode in which only the mechanical chassis is stopped, concretely, the operations of the rotatable drum 102 and the capstan/pinch roller 103 are stopped, and the camera 106, microphone 107 and video/audio signal processing circuit 105 continue to be operated while supplying an electric power to them. Further, an operation for releasing (returning to an unloading condition) contact (winding) between the magnetic tape 101 and the rotatable drum 102 may also be included.

Step S408:

As a result of the judgement in the step S406, if the "shut-off control is selected, the microcomputer 109 effects control in such a manner that the operation mode is automatically changed to the stop mode and the power source of the entire VCR 100 of camera integral type is turned OFF.

As mentioned above, in the illustrated embodiment, it is designed so that, when the record temporary stop mode is continued for the predetermined time period, the user can appropriately select whether the control (shut-off control) in which the operation mode is automatically changed to the stop mode and the power source of the entire VCR 100 of camera integral type is turned OFF is executed or the control (VCR stop control) in which the operation mode is changed to the mode in which only the mechanical chassis (rotatable drum 102 and capstan/pinch roller 103) is stopped and the image being photo-taken is continuously outputted from the external output terminal 108 for the video signal is executed. With this design, the conventional problem in which the apparatus is automatically changed to the power source OFF mode unintentionally to interrupt the image to the connected monitor can be solved.

Fifth Embodiment

Figure 8:
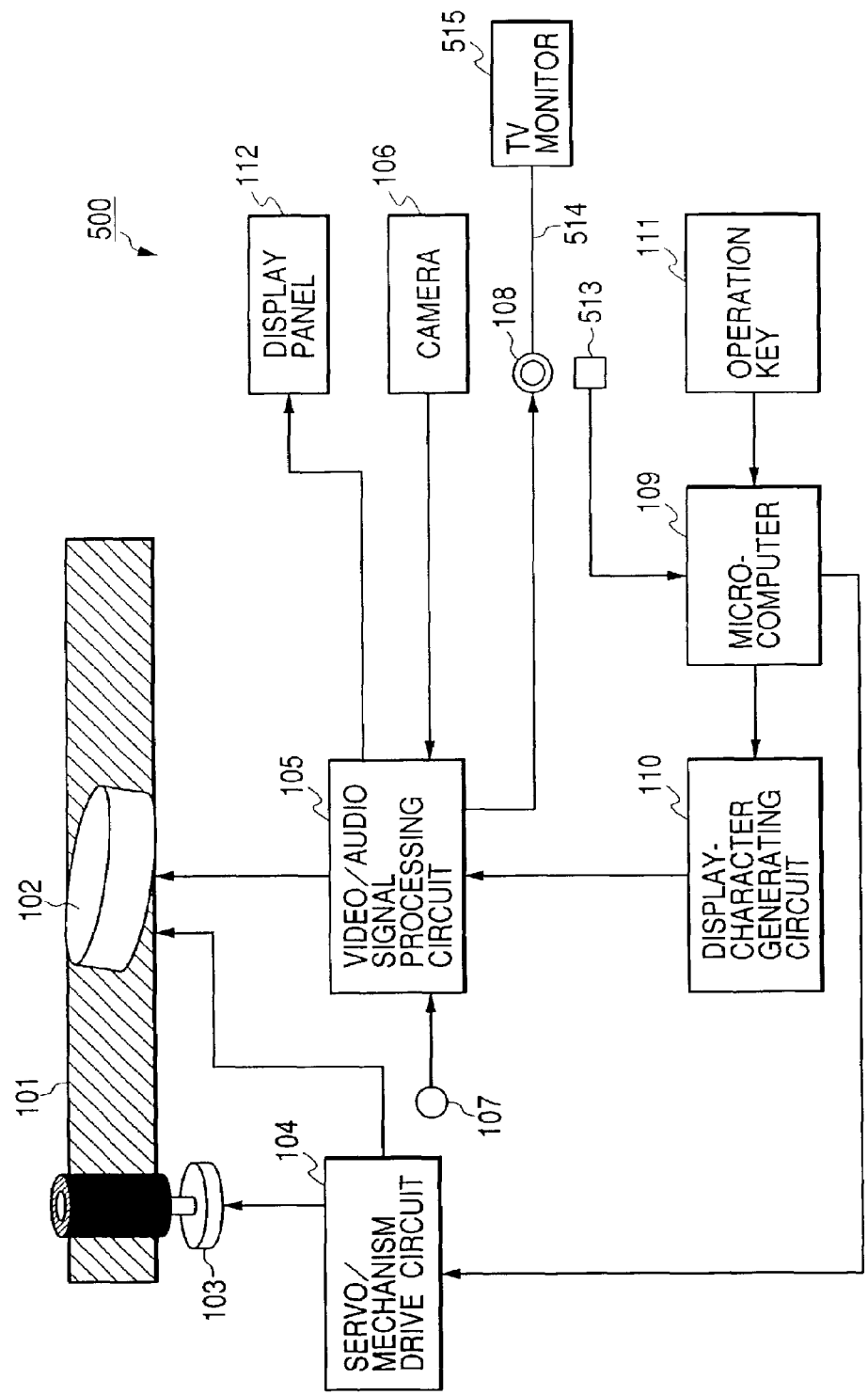
FIG. 8 is a constructional view of a VCR of camera integral type to which the present invention is applied in a fifth embodiment of the present invention.

The present invention is applied to a VCR 500 of camera integral type as shown in FIG. 8, for example.

In the VCR 500 of camera integral type according to this embodiment, a TV monitor 515 can be connected to the VCR 100 of camera integral type of FIG. 1 via a video cable 514.

For this purpose, the VCR 500 of camera integral type is provided with a switch 513 for detecting whether or not the video cable 514 is connected to the external output terminal 108 for the video signal.

Incidentally, in the VCR 500 of camera integral type of FIG. 8, elements having the same functions as those in the VCR 100 of camera integral type of FIG. 1 are designated by the same reference numerals and detailed explanation thereof will be omitted.

Figure 9:
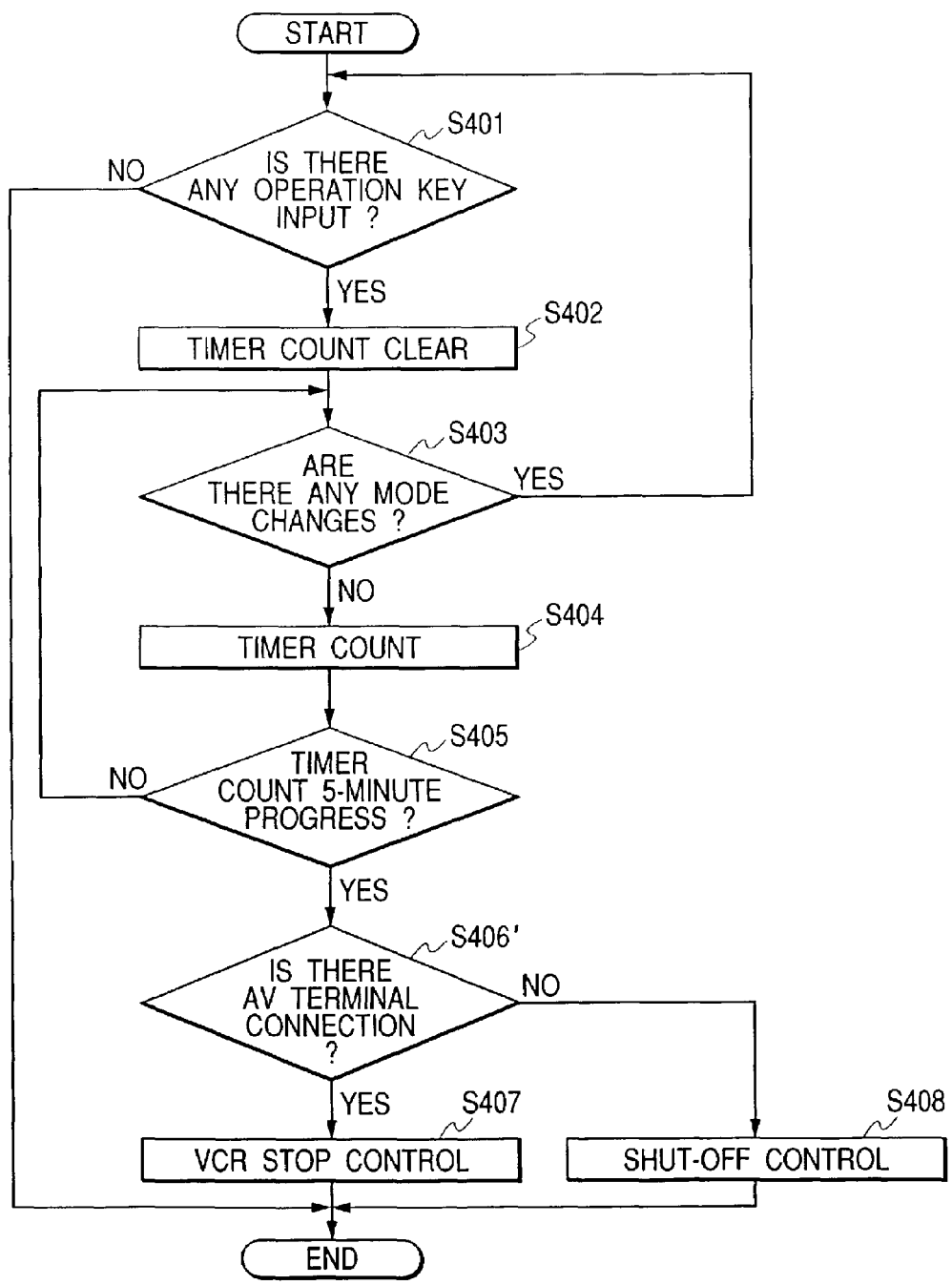
FIG. 9 is a flow chart for explaining an operation of the VCR of camera integral type in the fifth embodiment.

FIG. 9 is a flow chart showing an operation of the VCR 500 of camera integral type.

For example, the microcomputer 109 reads out and executes a processing program corresponding to the flow chart of FIG. 9 previously stored in a program memory through the CPU. As a result, the VCR 100 of camera integral type is operated as follows.

Incidentally, in the flow chart shown in FIG. 9, steps executing the same processing operations as those in the flow chart shown in FIG. 7 are designated by the same step numbers and detailed explanation thereof will be omitted.

That is to say, in the operation (fourth embodiment) shown in the flow chart of FIG. 7, in the step S406, while it was judged whether the user selects the "shut-off control" or the "VCR stop control", in a fifth embodiment of the present invention, as shown in FIG. 9, in a step S406', the microcomputer 109 judges whether the video cable 514 is connected to the external output terminal 108 for the video signal, on the basis of detection result of the switch 513.

As a result of judgement in the step S406', if the video cable 514 is connected to the external output terminal 108, the microcomputer 109 executes the VCR stop control to change the operation mode to the mode in which only the mechanical chassis is stopped (step S407). On the other hand, if the video cable 514 is not connected to the external output terminal 108, the microcomputer 109 executes the shut-off control to change the operation mode to the stop mode (power source OFF condition) (step S408).

As mentioned above, in the illustrated embodiment, it is designed so that, when the record temporary stop mode continues for the predetermined time period, on the basis of the connection/disconnection of the TV monitor 515, it is automatically selected whether the control (shut-off control) in which the operation mode is automatically changed to the stop mode and the power source of the entire VCR 100 of camera integral type is turned OFF is executed or the control (VCR stop control) in which the operation mode is changed to the mode in which only the mechanical chassis (rotatable drum 102 and capstan/pinch roller 103) is stopped and the image being photo-taken is continuously outputted from the external output terminal 108 for the video signal is executed. With this design, the conventional problem in which the apparatus is automatically changed to the power source OFF mode unintentionally to interrupt the image to the connected monitor (TV monitor 515) can be solved.

Sixth Embodiment

Figure 10:
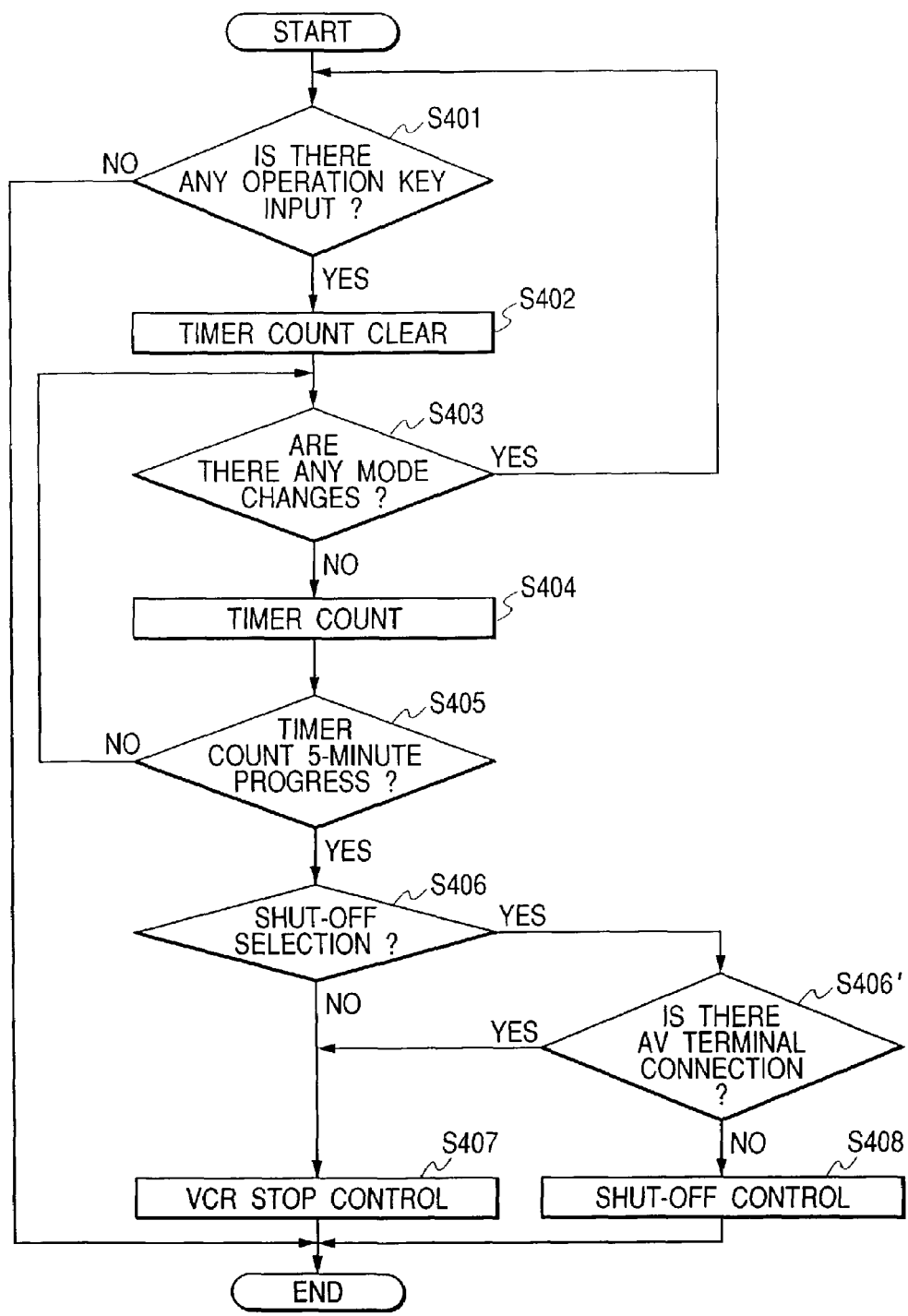
FIG. 10 is a flow chart for explaining an operation of the VCR of camera integral type in a sixth embodiment of the present invention.

In a sixth embodiment of the present invention, the VCR 500 of camera integral type is operated in accordance with a flow chart shown in FIG. 10.

Incidentally, in the flow chart shown in FIG. 10, steps executing the same processing operations as those in the flow charts shown in FIGS. 7 and 9 are designated by the same step numbers and detailed explanation thereof will be omitted.

That is to say, in the sixth embodiment, on the basis of the judgement whether the "shut-off control" is selected or the "VCR stop control" is selected by the user and on the basis of the judgement whether or not the TV monitor 515 is connected, the VCR stop control is executed or the shut-off control is executed.

Concretely, as shown in FIG. 10, first of all, in the step S406, the microcomputer 109 judges whether the "shut-off control" is selected or the "VCR stop control" is selected by the user. As a result of the judgement in the step S406, if the "shut-off control" is selected, the microcomputer 109 judges whether the video cable 514 is connected to the external output terminal 108 for the video signal, on the basis of the detection result of the switch 513 (step S406').

As a result of the judgement in the step S406', if the video cable 514 is connected to the external output terminal 108, or, as a result of the judgement in the step S406, the "VCR stop control" is selected, the microcomputer 109 executes the VCR stop control to change the operation mode to the mode in which only the mechanical chassis is stopped (step S407).

On the other hand, as a result of the judgement in the step S406', if the video cable 514 is not connected to the external output terminal 108, the microcomputer 109 executes the shut-off control to change the operation mode to the stop mode (power source OFF condition) (step S408).

As mentioned above, in the illustrated embodiment, it is designed so that, when the record temporary stop mode continues for the predetermined time period, on the basis of the user's selection and the connection/disconnection of the TV monitor 515, it is automatically selected whether the control (shut-off control) in which the operation mode is automatically changed to the stop mode and the power source of the entire VCR 100 of camera integral type is turned OFF is executed or the control (VCR stop control) in which the operation mode is changed to the mode in which only the mechanical chassis (rotatable drum 102 and capstan/pinch roller 103) is stopped and the image being photo-taken is continuously outputted from the external output terminal 108 for the video signal is executed. With this design, the conventional problem in which the apparatus is automatically changed to the power source OFF mode unintentionally to interrupt the image to the connected monitor (TV monitor 515) can be solved.

Seventh Embodiment

Figure 11:
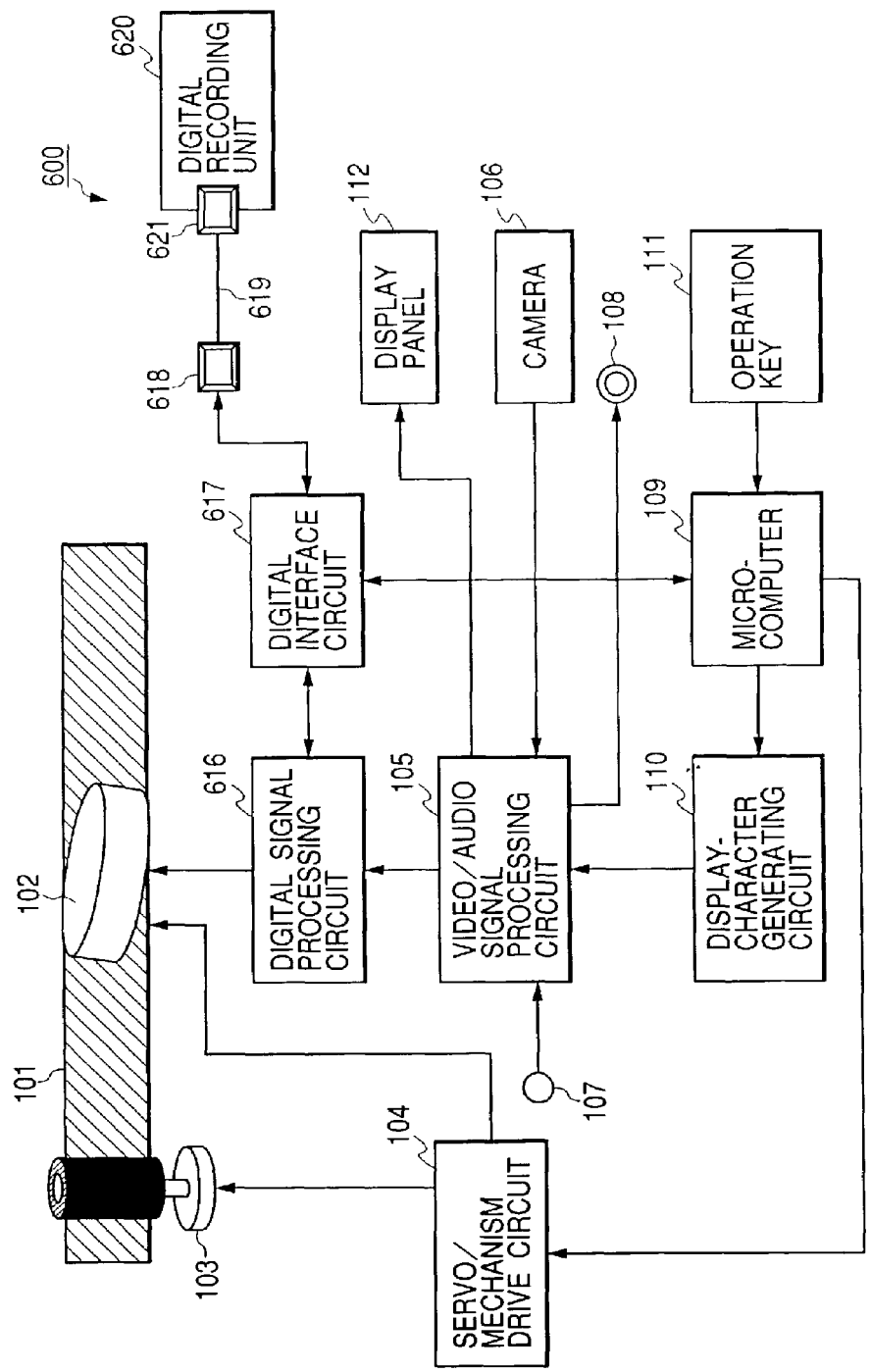
FIG. 11 is a constructional view of a VCR of camera integral type to which the present invention is applied in a seventh embodiment of the present invention.

The present invention is applied to a VCR 600 of camera integral type as shown in FIG. 11, for example.

In the VCR 600 of camera integral type according to this embodiment, an external device such as a digital recording apparatus 620 can be connected to the VCR 100 of camera integral type of FIG. 1.

Incidentally, in the VCR 600 of camera integral type of FIG. 11, elements having the same functions as those in the VCR 100 of camera integral type of FIG. 1 are designated by the same reference numerals and detailed explanation thereof will be omitted.

Concretely, for this purpose, as shown in FIG. 11, the VCR 600 of camera integral type is further provided with a digital interface terminal 618, a digital interface circuit 617 and a digital signal processing circuit 616, as well as the elements in the VCR 100 of camera integral type of FIG. 1.

The digital signal processing circuit 616 serves to convert the signal outputted from the video/audio signal processing circuit into a digital code (digital data). Such digital data is recorded on the magnetic tape 101.

The digital signal interface circuit 617 serves to detect whether the external device such as the digital recording apparatus 620 is connected to the VCR 600 of camera integral type via the digital interfaces 618, 621 and a digital cable 619 and to convert the digital data obtained by the digital signal processing circuit 616 into data for communication (digital communication data). As the digital interfaces and the digital cable, IEEE 1394 serial bus and/or USB are typically used.

Incidentally, as a concrete method for detecting whether the external device such as the digital recording apparatus 620 is connected to the VCR 600 of camera integral type, for example, there is a method for detecting whether DC bias voltage from the external device is applied to the digital interface terminal 618 or whether communication data packet is inputted to the digital interface terminal 618.

Figure 12:
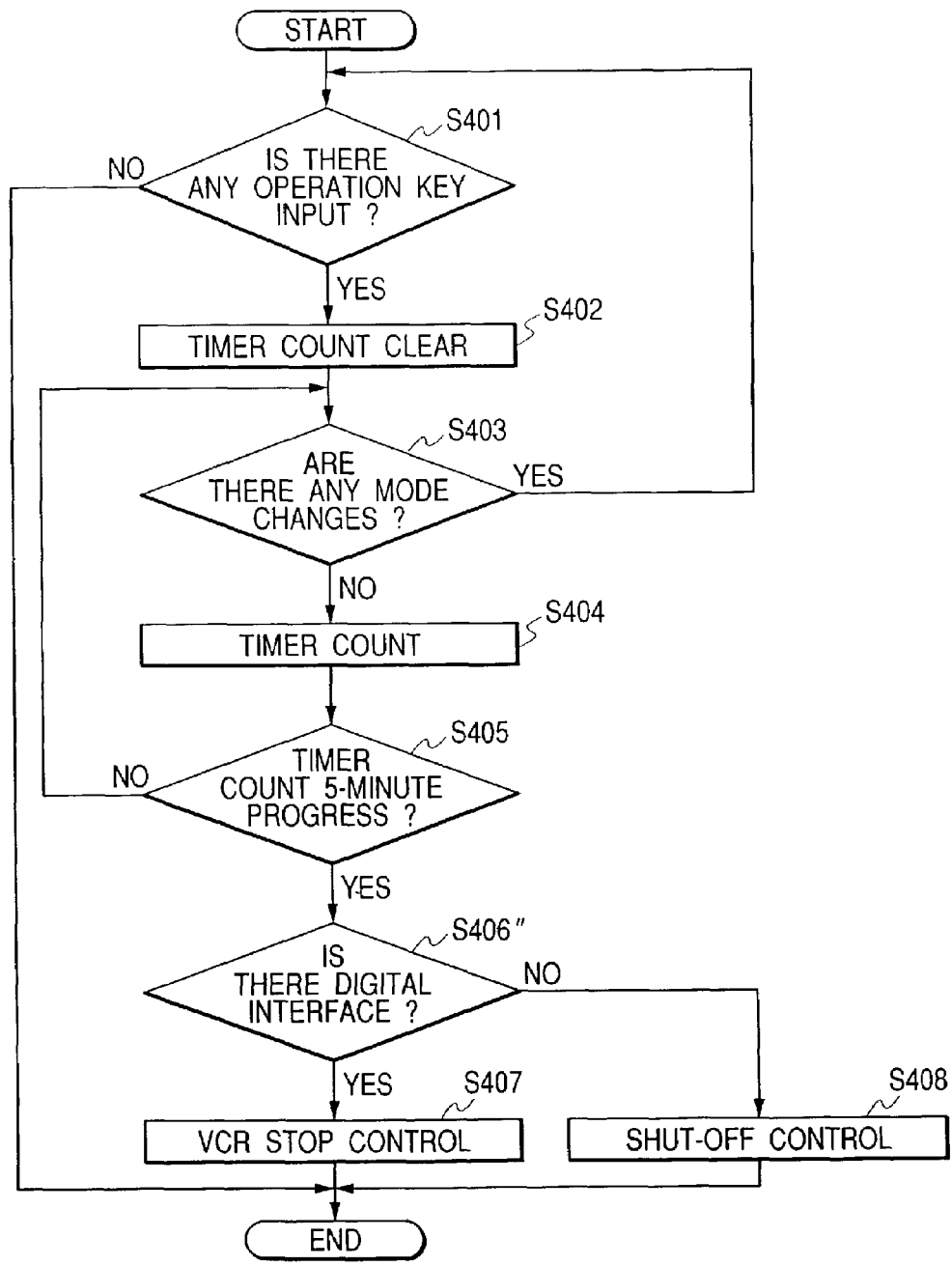
FIG. 12 is a flow chart for explaining an operation of the VCR of camera integral type in the seventh embodiment.

FIG. 12 is a flow chart showing an operation of the VCR 600 of camera integral type.

For example, the microcomputer 109 reads out and executes a processing program corresponding to the flow chart of FIG. 12 previously stored in a program memory through the CPU.

As a result, the VCR 600 of camera integral type is operated as follows.

Incidentally, in the flow chart shown in FIG. 12, steps executing the same processing operations as those in the flow chart shown in FIG. 7 are designated by the same step numbers and detailed explanation thereof will be omitted.

That is to say, in the operation (fourth embodiment) shown in the flow chart of FIG. 7, in the step S406, while it was judged whether the user selects the "shut-off control" or the "VCR stop control", in a seventh embodiment of the present invention, as shown in FIG. 12, in a step S406", the microcomputer 109 judges whether the external device such as the digital recording apparatus 620 is connected to the digital interface terminal 618 via the digital interface circuit 617, on the basis of bias detection or signal detection.

As a result of the judgement in the step S406", if the external device is connected to the digital interface terminal 618, the microcomputer 109 executes the VCR stop control to change the operation mode to the mode in which only the mechanical chassis is stopped (step S407). On the other hand, if the external device is not connected, the microcomputer 109 executes the shut-off control to change the operation mode to the stop mode (power source OFF condition) (step S408).

Incidentally, in the VCR stop control according to the illustrated embodiment, only the mechanical chassis (rotatable drum 102 and capstan/pinch roller 103) is changed to the stop mode, and the image is continuously outputted from the video signal external output terminal 108 and the digital interface terminal 618. Accordingly, in the digital recording apparatus 620 connected to the digital interface terminal 618, the image obtained from the VCR 600 of camera integral type can continuously be recorded.

As mentioned above, in the illustrated embodiment, it is designed so that, when the record temporary stop mode continues for the predetermined time period, on the basis of the connection/disconnection of the external device such as the digital recording apparatus 620, it is automatically selected whether the control (shut-off control) in which the operation mode is automatically changed to the stop mode and the power source of the entire VCR 100 of camera integral type is turned OFF is executed or the control (VCR stop control) in which the operation mode is changed to the mode in which only the mechanical chassis (rotatable drum 102 and capstan/pinch roller 103) is stopped and the image being photo-taken is continuously outputted from the video signal external output terminal 108 and the digital interface terminal 618 is executed. With this design, the conventional problem in which the apparatus is automatically changed to the power source OFF mode unintentionally to interrupt the image of the external device can be solved.

Eighth Embodiment

Figure 13:
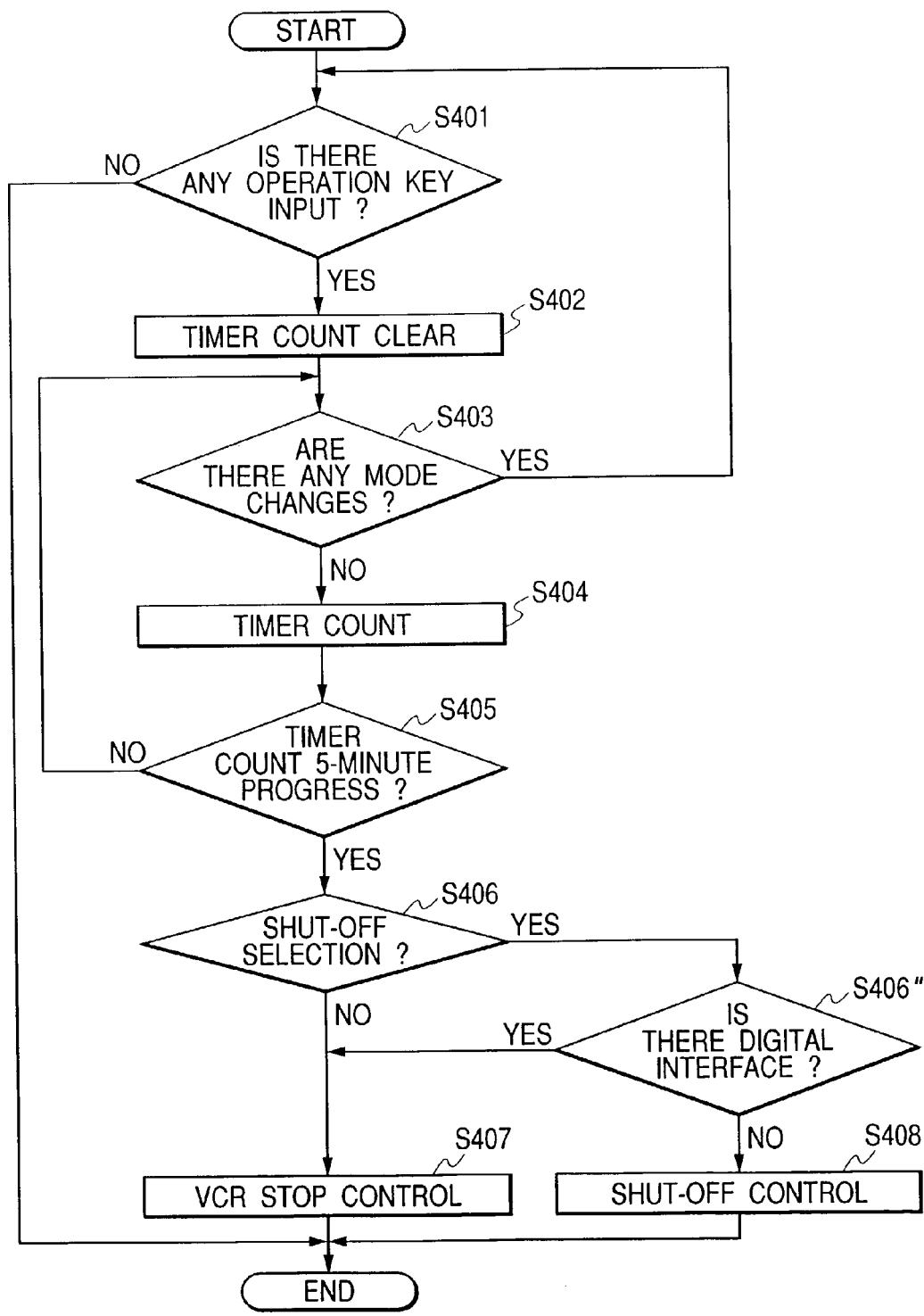
FIG. 13 is a flow chart for explaining an operation of the VCR of camera integral type in an eighth embodiment of the present invention.

In an eighth embodiment of the present invention, the VCR 600 of camera integral type is operated in accordance with a flow chart shown in FIG. 13, for example.

Incidentally, in the flow chart shown in FIG. 13, steps executing the same processing operations as those in the flow charts shown in FIGS. 7 and 12 are designated by the same step numbers and detailed explanation thereof will be omitted.

That is to say, in this embodiment, on the basis of the result of the judgement whether the "shut-off control" is selected or the "VCR stop control" is selected by the user and result of the judgement whether the external device such as the digital recording apparatus 620 is connected or not, the VCR stop control is effected or the shut-off control is effected.

Concretely, as shown in FIG. 13, first of all, in the step S406, the microcomputer 109 judges whether the "shut-off control is selected or the "VCR stop control" is selected by the user.

As a result of the judgement in the step S406, if the "shut-off control is selected, the microcomputer 109 judges, via the digital interface circuit 617, whether the external device such as the digital recording apparatus 620 is connected to the digital interface terminal 618 on the basis of bias detection or signal detection (step S406").

As a result of the step S406", if the external device is connected to the digital interface terminal 618, or, as a result of the judgement in the step S406, if the "VCR stop control" is selected, the microcomputer 109 executes the VCR stop control to change the operation mode to the mode in which only the mechanical chassis is stopped (step S407).

On the other hand, as a result of the step S406", if the external device is not connected, the microcomputer 109 executes the shut-off control to change the operation mode to the stop mode (power source OFF condition) (step S408).

As mentioned above, in the illustrated embodiment, it is designed so that, when the record temporary stop mode continues for the predetermined time period, on the basis of the user's selection and the connection/disconnection of the external device such as the digital recording apparatus 620 to the digital interface terminal 618, it is automatically selected whether the control (shut-off control) in which the operation mode is automatically changed to the stop mode and the power source of the entire VCR 100 of camera integral type is turned OFF is executed or the control (VCR stop control) in which the operation mode is changed to the mode in which only the mechanical chassis (rotatable drum 102 and capstan/pinch roller 103) is stopped and the image being photo-taken is continuously outputted from the video signal external output terminal 108 and the digital interface terminal 618 is executed. With this design, the conventional problem in which the apparatus is automatically changed to the power source OFF mode unintentionally to interrupt the image of the external device can be solved.

Ninth Embodiment

Figure 14:
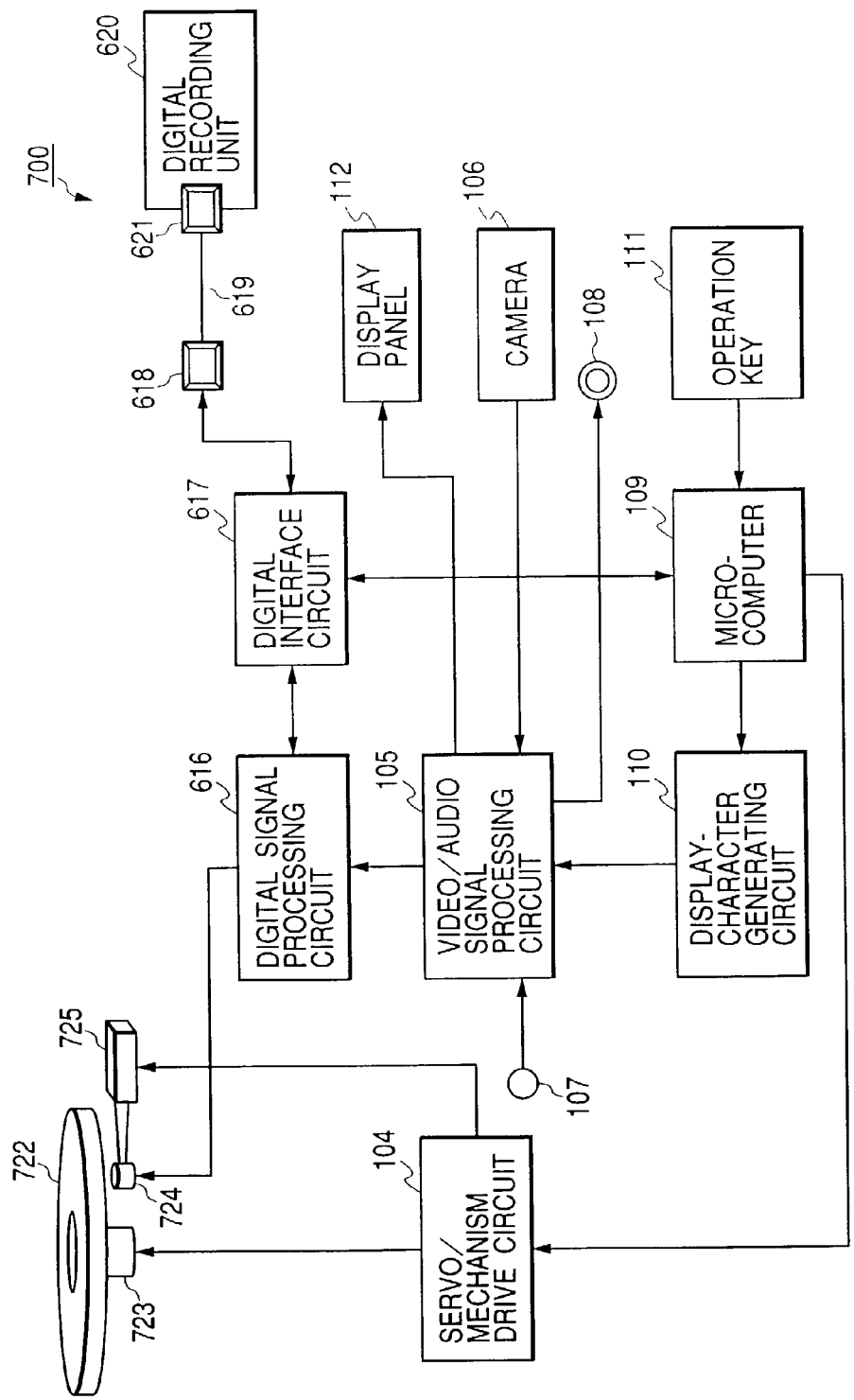
FIG. 14 is a constructional view of a recording apparatus of camera integral type to which the present invention is applied in a ninth embodiment of the present invention.

The present invention is applied to a recording apparatus 700 of camera integral type as shown in FIG. 14, for example.

While the VCR 600 of camera integral type of FIG. 11 was designed to effect the recording on the magnetic tape 101, the recording apparatus 700 of camera integral type according to a ninth embodiment of the present invention is designed to effect recording on a disk-shaped recording medium 722.

Incidentally, in the recording apparatus 700 of camera integral type of FIG. 14, elements having the same functions as those in the VCR 600 of camera integral type of FIG. 11 are designated by the same reference numerals and detailed explanation thereof will be omitted. Further, the VCR 500 of camera integral type of FIG. 8 may be designed similar to the construction of FIG. 14 to permit recording on the disk-recording medium 722.

Concretely, the recording apparatus 700 of camera integral type includes a disk motor 723 for rotatingly driving the disk recording medium 722, a recording head 724 for recording a signal on the disk recording medium 722, and an actuator 725 for shifting the recording head 724. Accordingly, the servo/mechanism drive circuit 104 controls the driving of the disk motor 723 and the actuator 725.

In the recording apparatus 700 of camera integral type as mentioned above, in the record temporary stop mode, the microcomputer 109 controls the driving of the disk motor 723 through the servo/mechanism drive circuit 104 and controls the shifting movement of the recording head 724 to a recording start position via the actuator 725.

Further, in the stop mode in which only the mechanical chassis is stopped, the microcomputer 109 controls the driving of the disk motor 723 through the servo/mechanism drive circuit 104 and controls the shifting movement of the recording head 724 to a waiting position via the actuator 725.

Alternatively, in the stop mode in which only the mechanical chassis is stopped, the stopping of the disk motor 723 may be controlled and the recording head 724 may be waited while maintaining the present position (or waiting at the recording start position).

Also in the illustrated embodiment, by operating the recording apparatus 700 of camera integral type in accordance with the flow chart shown in FIG. 9 or FIG. 10, the same effect as those in the seventh and eighth embodiments can be obtained.

Incidentally, in the first to ninth embodiments, while an example that the magnetic tape or the disk recording medium is used as the recording medium to be recorded was explained, the present invention is not limited to such an example.

Further, it should be noted that the objects of the present invention can also be achieved by supplying a storing medium storing a program code of software for realizing functions of hosts and terminals of the first to ninth embodiments to a system or an apparatus and by reading out and executing the program code stored in the storing medium by means of a computer (or CPU or MPU) of the system or the apparatus.

In this case, the program code itself read out from the storing medium realizes the functions of the first to ninth embodiment, and the storing medium storing such program code and the program code are included in the present invention.

As the storing medium for supplying the program code, a flexible disk, a hard disk, an optical disk, a photo-magnetic disk, a CD-ROM, a CD-R, a magnetic tape or a non-volatile memory card may be used.

Further, it should be noted that the present invention includes a concept that not only the functions of the first to ninth embodiments are realized by executing the program code read out by means of the computer, but also OS (operating system) running on the computer executes the actual processing partially or totally on the basis of instruction of the program code to realize the functions of the first to ninth embodiments.

Further, it should be noted that the present invention includes a concept that, after the program code read out from the storing medium is written in a memory of a function expansion board inserted into the computer or a function expansion unit connected to the computer, a CPU of the function expansion board or of the function expansion unit executes the actual processing partially or totally on the basis of instruction of the program code to realize the functions of the first to ninth embodiments.

Figure 15:
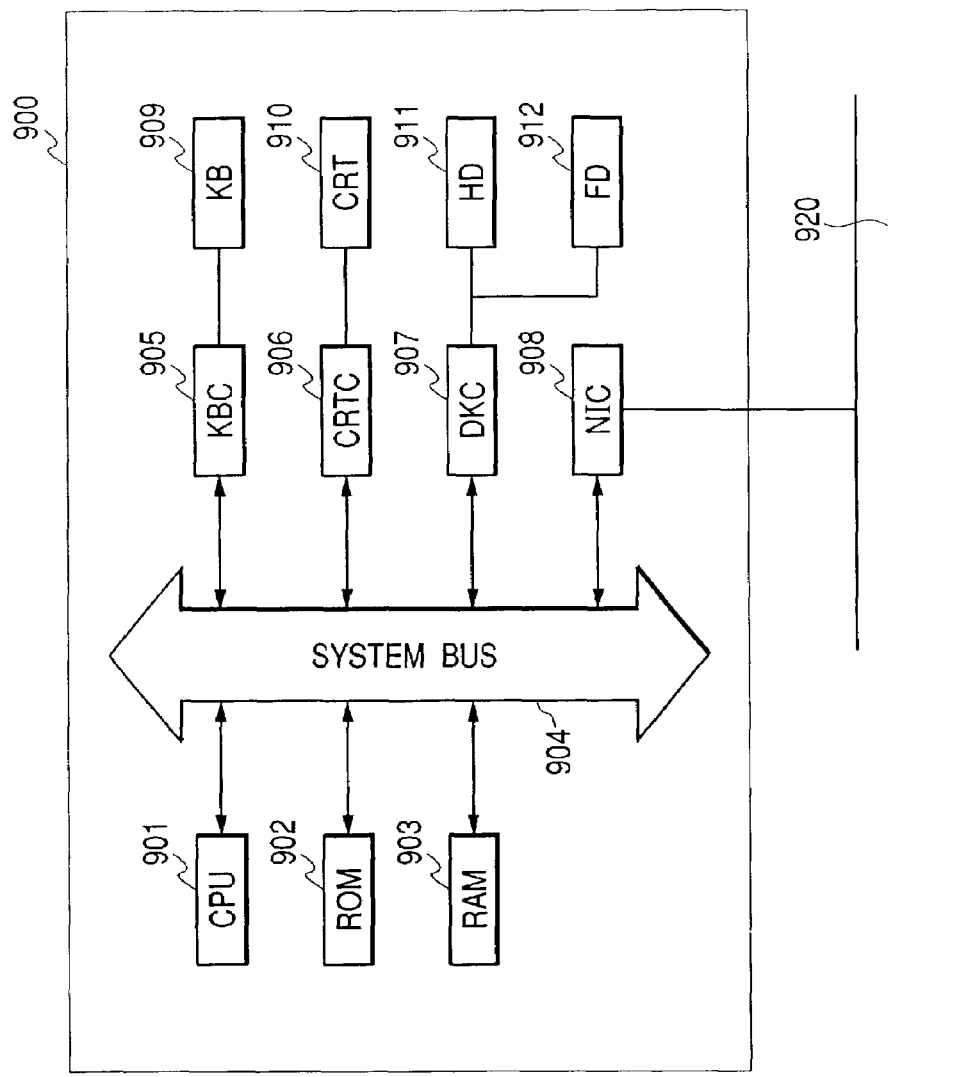
FIG. 15 is a block diagram showing a construction of a computer for reading out a program for realizing a function of the VCR of camera integral type to which the present invention is applied via the computer from a computer-readable recording medium and for executing such program.
Figure 16:
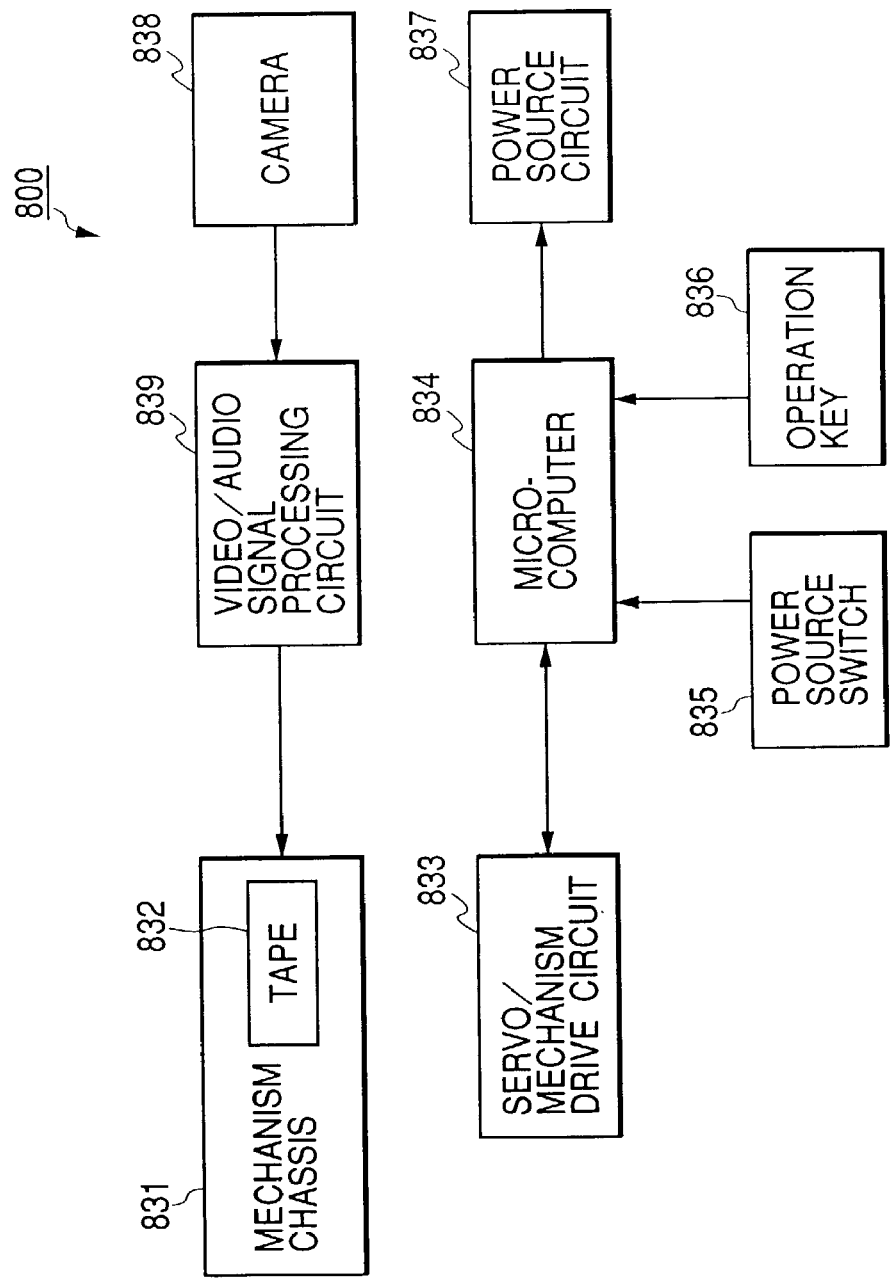
FIG. 16 is a constructional view of a conventional VCR of camera integral type.

FIG. 15 shows a function 900 of the computer. As shown in FIG. 15, the computer function 900 includes a CPU 901, a ROM 902, a RAM 903, a keyboard controller (KBC) 905 for a keyboard (KB) 909, a CRT controller (CRTC) 906 for a CRT display (CRT) 910 as a display unit, a disk controller (DKC) 907 for a hard disk (BD) 911 and a flexible disk (FD) 912, and a network interface controller (NIC) 908 for connection to a network 920, which elements are interconnected via a system bus 904 to permit communication.

The CPU 901 collectively controls the elements connected by the system bus 904 by executing software stored in the ROM 902 or the HD 911 or software supplied from the FD 912.

That is to say, the CPU 901 reads out and executes a processing program in accordance with predetermined sequence from the ROM 902, HD 911 or FD 912 to effect control for realizing the operations of the first to ninth embodiments.

The RAM 903 acts as a main memory or a work area for the CPU 901.

The KBC 905 serves to control instruction input from the KB 909 or a pointing device (not shown).

The CRTC 906 serves to control display of the CRT 910.

The DKC 907 serves to control access to the HD 911 and the FD 912 for storing boot program, various applications, edition files, user files, network managing program and predetermined processing program in the first to ninth embodiments.

The NIC 908 serves to send/receive data with respect to devices or systems on the network 920 in a bi-direction.

As mentioned above, in the present invention, in case of the predetermined operation mode, since it is designed to control at least one of the first drive means, second drive means and output means on the basis of the external instruction, for example, when the record temporary stop mode in which the second drive means for the recording medium is in the stopped condition and the first drive means for the recording head is in the operative condition is established, on the basis of the user's instruction, the first drive means can be changed to the stop condition and the output means can continuously be maintained in the operative condition.

Consequently, for example, in a case where the apparatus or the system according to the present invention is used for business application such as image production to photo-take a wild animal, even when the record temporary stop mode is continued in order to catch the limited photo-taking chance while observing the object to be photo-taken through the monitor for a long term, since the power source is not automatically turned OFF and the video signal is continuously outputted to the monitor as it is, the photo-taking can be continued without inconvenience.

Therefore, according to the present invention, an apparatus or a system in which an information recording operation can be effected without inconvenience for both domestic and business applications can be provided.

What is claimed is:

1. An information recording apparatus for recording information on a recording medium, comprising:

information acquiring means for acquiring information to be recorded on said recording medium;

recording means for recording the information acquired by said information acquiring means on said recording medium;

first drive means for driving said recording means;

second drive means for driving said recording medium so that the information is recorded on said recording medium by said recording means;

output means for outputting the information acquired by said information acquiring means to an external device;

setting means for selectively setting a first record temporary stop mode for stopping drive of one of said first drive means and said second drive means and a second record temporary stop mode for stopping drive of both of said first drive means and said second drive means; and control means for controlling in such a manner that, if other apparatus or a system is connected to said output means in the first record temporary stop mode, said control means switches over to the second record temporary stop mode set by said setting means on the basis of a connection condition of the other apparatus or the system to said output means, and controls said output means so as to operate continuously if said control means is in the second record temporary stop mode.

2. An apparatus according to claim 1, wherein, when said first and second drive means are stopped, said control means shift said first drive means or said second drive means from a recording position to a waiting position.

3. An apparatus according to claim 1, wherein said control means switches over to an electric power OFF state after predetermined time period elapses if the other apparatus or the system is not connected to said output means when said control means is in the first record temporary stop mode.

4. An image recording apparatus for recording an image signal on a recording medium by means of a recording head, comprising:
   image processing means for processing a signal of an image;
   first drive means for driving said recording head;
   second drive means for driving the recording medium so that the image signal acquired by said image processing means is recorded at a predetermined position by said recording head;
   output means for outputting the image signal acquired by said image processing means to an external device;
   setting means for selectively setting a first record temporary stop mode for stopping drive of one of said first drive means and said second drive means and a second record temporary stop mode for stopping drive of both of said first drive means and said second drive means; and
   control means for controlling in such a manner that, if other apparatus or a system is connected to said output means in the first record temporary stop mode, said control means switches over to the second record temporary stop mode set by said setting means on the basis of a connection condition of the other apparatus or system to said output means, and controls said image processing means and said output means so as to operate continuously if said control means is in the second record temporary stop mode.

5. An apparatus according to claim 4, wherein, when said first and second drive means are stopped, said control means shift said first drive means and/or said second drive means from a recording position to a waiting position.

6. An apparatus according to claim 4, wherein said control means switches over to an electric power OFF state after predetermined time period elapses if the other apparatus or the system is not connected to said output means when said control means is in the first record temporary stop mode.

7. An apparatus according to claim 4, further comprising photo-taking means for photo-taking the image, and wherein, when said control means is in the second record temporary stop mode, said control means controls to continuously operate said photo-taking means as well as said image processing means and said output means.

8. An apparatus according to claim 4, wherein the recording medium is a magnetic tape, and said second drive means includes a capstan.

9. An apparatus according to claim 4, wherein the recording medium is a disk-shaped recording medium, and said first drive means includes an actuator.

10. An image recording apparatus for recording an image signal on a recording medium by means of a recording head, comprising:
   camera unit configured to capture an image;
   image processing unit configured to process a signal of the image captured by said camera unit;
   recording head drive unit configured to drive the recording head;
   recording medium drive unit configured to drive the recording medium so that the image signal acquired by said image processing unit is recorded at a predetermined position by the recording head;
   output unit configured to output the image signal acquired by said image processing unit to an external device;
   setting unit configured to selectively set a first record temporary stop mode for stopping drive of one of said recording head drive unit and said recording medium drive unit and a second record temporary stop mode for stopping drive of both of said recording head drive unit and said recording medium drive unit; and
   control unit configured to control in such a manner that, if other apparatus or a system is connected to said output unit in the first record temporary stop mode, said control unit switches over to the second record temporary stop mode set by said setting unit on the basis of a connection condition of the other apparatus or the system to said output unit, and controls said camera unit, said image processing unit and said output unit so as to operate continuously if said control unit is in the second record temporary stop mode.

11. An image recording apparatus for recording an image signal on a recording medium by means of a recording head, comprising:
   camera unit configured to capture an image;
   image processing unit configured to process a signal of the image captured by said camera unit;
   recording head drive unit configured to drive the recording head;
   recording medium drive unit configured to drive the recording medium so that the image signal acquired by said image processing unit is recorded at a predetermined position by the recording head;
   output unit configured to output the image signal acquired by said image processing unit to an external device;
   setting unit configured to selectively set a first record temporary stop mode for stopping drive of one of said recording head drive unit and said recording medium drive unit and a second record temporary stop mode for stopping drive of both of said recording head drive unit and said recording medium drive unit; and
   control unit configured to control in such a manner that said control unit first effects the first record temporary stop mode and switches over from the first record temporary stop mode to the second record temporary stop mode after a predetermined time period elapses when said control unit remains in the first record temporary stop mode, and controls said output unit so as to operate continuously if said control unit is in one of the first record temporary stop mode and the second record temporary stop mode.

* * * * *